(12) United States Patent
Mayle et al.

(10) Patent No.: US 9,576,221 B2
(45) Date of Patent: Feb. 21, 2017

(54) SYSTEMS, METHODS, AND DEVICES FOR IMAGE MATCHING AND OBJECT RECOGNITION IN IMAGES USING TEMPLATE IMAGE CLASSIFIERS

(71) Applicant: Ditto Labs, Inc., Cambridge, MA (US)

(72) Inventors: Neil Lawrence Mayle, Cambridge, MA (US); Philip B. Romanik, West Haven, CT (US)

(73) Assignee: DITTO LABS, INC., Cambridge, MA (US)

( * ) Notice: Subject to any disclaimer, the term of this patent is extended or adjusted under 35 U.S.C. 154(b) by 0 days.

(21) Appl. No.: 14/745,363

(22) Filed: Jun. 19, 2015

(65) Prior Publication Data

US 2016/0012317 A1    Jan. 14, 2016

Related U.S. Application Data

(60) Provisional application No. 62/022,619, filed on Jul. 9, 2014.

(51) Int. Cl.
*G06K 9/62* (2006.01)
*G06K 9/46* (2006.01)

(52) U.S. Cl.
CPC ............ *G06K 9/6211* (2013.01); *G06K 9/4671* (2013.01); *G06K 9/6256* (2013.01); *G06K 9/6269* (2013.01)

(58) Field of Classification Search
CPC .. G06K 9/6282; G06K 9/3241; G06K 9/00973; G06K 9/4671; G06K 9/6255
USPC .......................................................... 382/159
See application file for complete search history.

(56) References Cited

U.S. PATENT DOCUMENTS

2013/0163870 A1*  6/2013  Cao ...................... G06K 9/4642
                                                    382/170

OTHER PUBLICATIONS

Ho et al: "Two-stage license plate detection using gentle adaboost and SIFT-SVM", IEEE, 2009.*

* cited by examiner

*Primary Examiner* — Ruiping Li
(74) *Attorney, Agent, or Firm* — Siritzky Law, PLLC

(57) ABSTRACT

An image matching technique locates feature points in a template image such as a logo and then does the same in a test image. Classifiers are trained for multiple template images and the classifiers are used to evaluate a match between a template image and a test image.

19 Claims, 19 Drawing Sheets

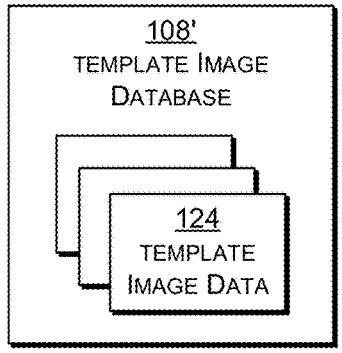
FIG. 2(A)
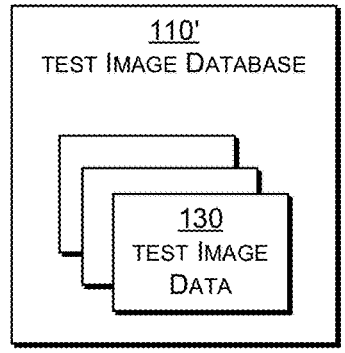
FIG. 2(C)
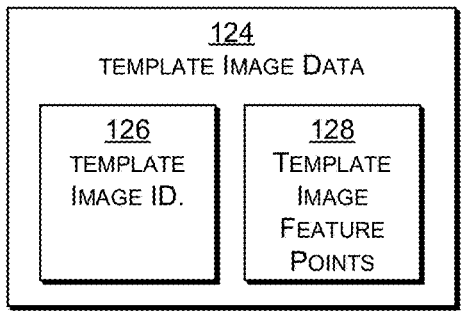
FIG. 2(B)
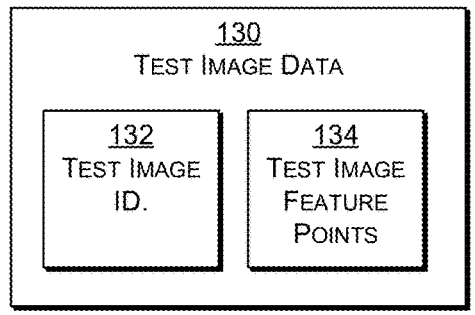
FIG. 2(D)
| IMAGE FEATURE POINTS | | |
|---|---|---|
| INDEX | LOCATION IN IMAGE (POSITION, SCALE, AND ROTATION) | DESCRIPTOR |
| 0 | $L_0$ | $D_0$ |
| 1 | $L_1$ | $D_1$ |
| ⋮ | ⋮ | ⋮ |
| K-1 | $L_{K-1}$ | $D_{K-1}$ |
FIG. 2(E)

| 136 MATCH IMAGE DATA | | | | |
|---|---|---|---|---|
| 138 TEST IMAGE ID. | 140 TEMPLATE ID. | 142 REVIEWED? | 144 TRUE POSITIVE? | 146 NUMBER OF FEATURE POINTS IN TEMPLATE |
| 148 MATCH SET | | | | |

| CLASSIFIERS | |
|---|---|
| TEMPLATE IMAGE | CLASSIFIER |
| TI1 | C1 |
| TI2 | C2 |
| ... | ... |
| TIk | Ck |

FIG. 2(J)

SYSTEMS, METHODS, AND DEVICES FOR IMAGE MATCHING AND OBJECT RECOGNITION IN IMAGES USING TEMPLATE IMAGE CLASSIFIERS

RELATED APPLICATIONS

This application claims the benefit of U.S. Provisional Application No. 62/022,619, filed Jul. 9, 2014, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to image processing, and, more particularly, to enhanced techniques for image matching and object recognition in images.

BACKGROUND

Image processing techniques exist for trying to determine whether one image is present in another image. More specifically, techniques exist for trying to determine whether one or more objects in one image are present in another image. Such object recognition/identification/location techniques vary in speed and accuracy, but do not scale well to real time and on-the-fly processing of multiple images.

It is desirable to provide object recognition/identification/location image processing techniques that improve the speed and/or accuracy of such techniques. It is further desirable to provide image processing techniques for object recognition/identification/location that support and scale to accurate real-time, on the fly, and batch processing of multiple images.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 2(a)-2(j) show aspects of databases and data structures used by the system of FIG. 1, according to exemplary embodiments hereof;

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:

GLOH means Gradient Location and Orientation Histogram;

MSER means maximally stable external regions;

PCA-SIFT means Principal Components Analysis SIFT;

RANSAC refers to RANdom SAmple Consensus;

RBF means radial basis function;

SIFT means Scale-Invariant Feature Transform;

SURF means Speeded Up Robust Features;

SVD means Singular Value Decomposition;

SVM means support vector machine; and a "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

BACKGROUND

The process of matching features from a template image to a set of test images results in a subset of the test images that are considered candidate-matching images. Some of the candidate images are true positives and actually contain a (possibly transformed) version or a portion of the template image. Other candidate images are false positives and a person viewing them would be confident that they do not actually contain the template image, a transformed version of the template or even a portion from a transformed version of the template.

Figure 6A:
FIGS. 6(a)-6(e) and 6(g) show examples of the matching of a portion of a template image to a test image.
Figure 6B:
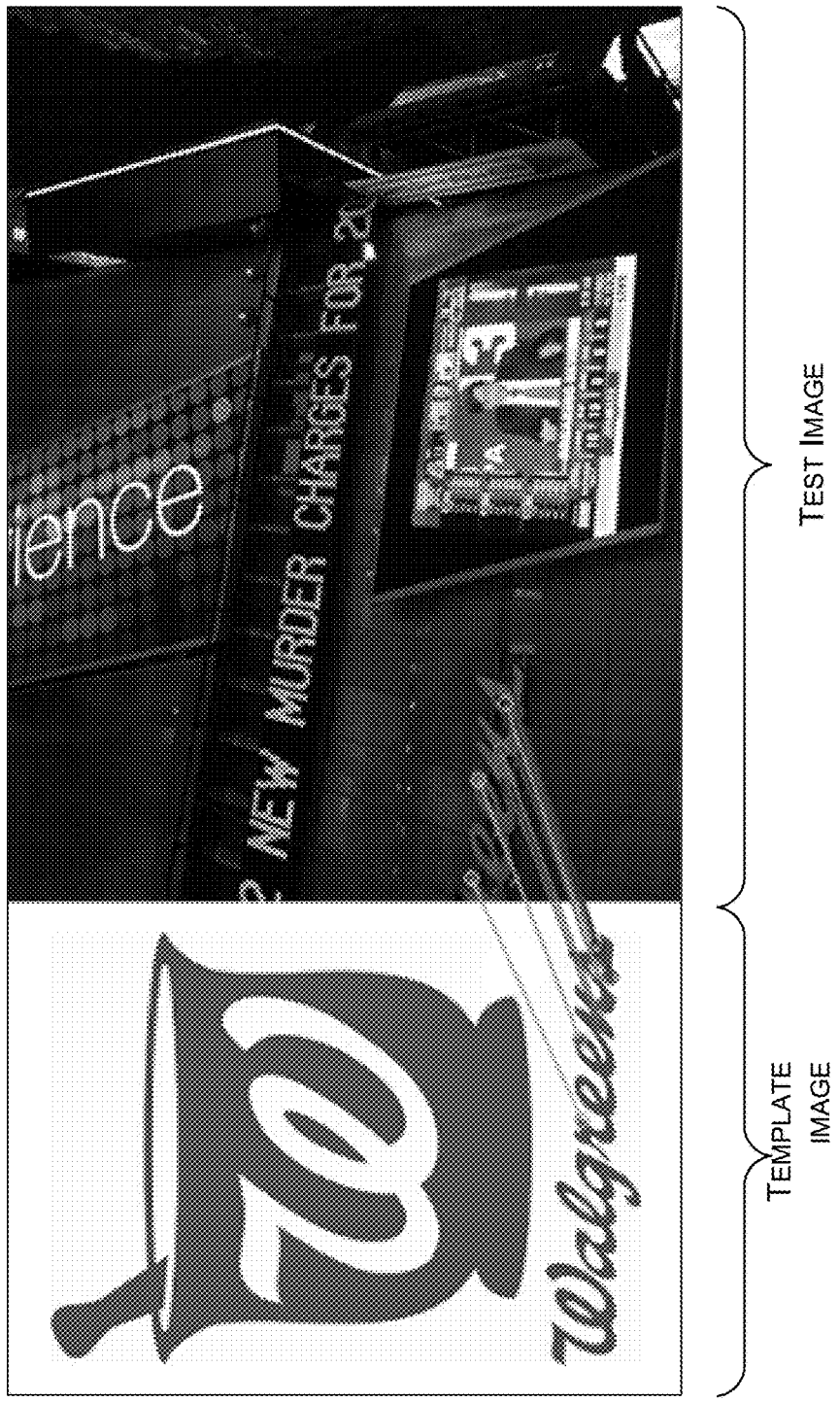
Figure 6C:
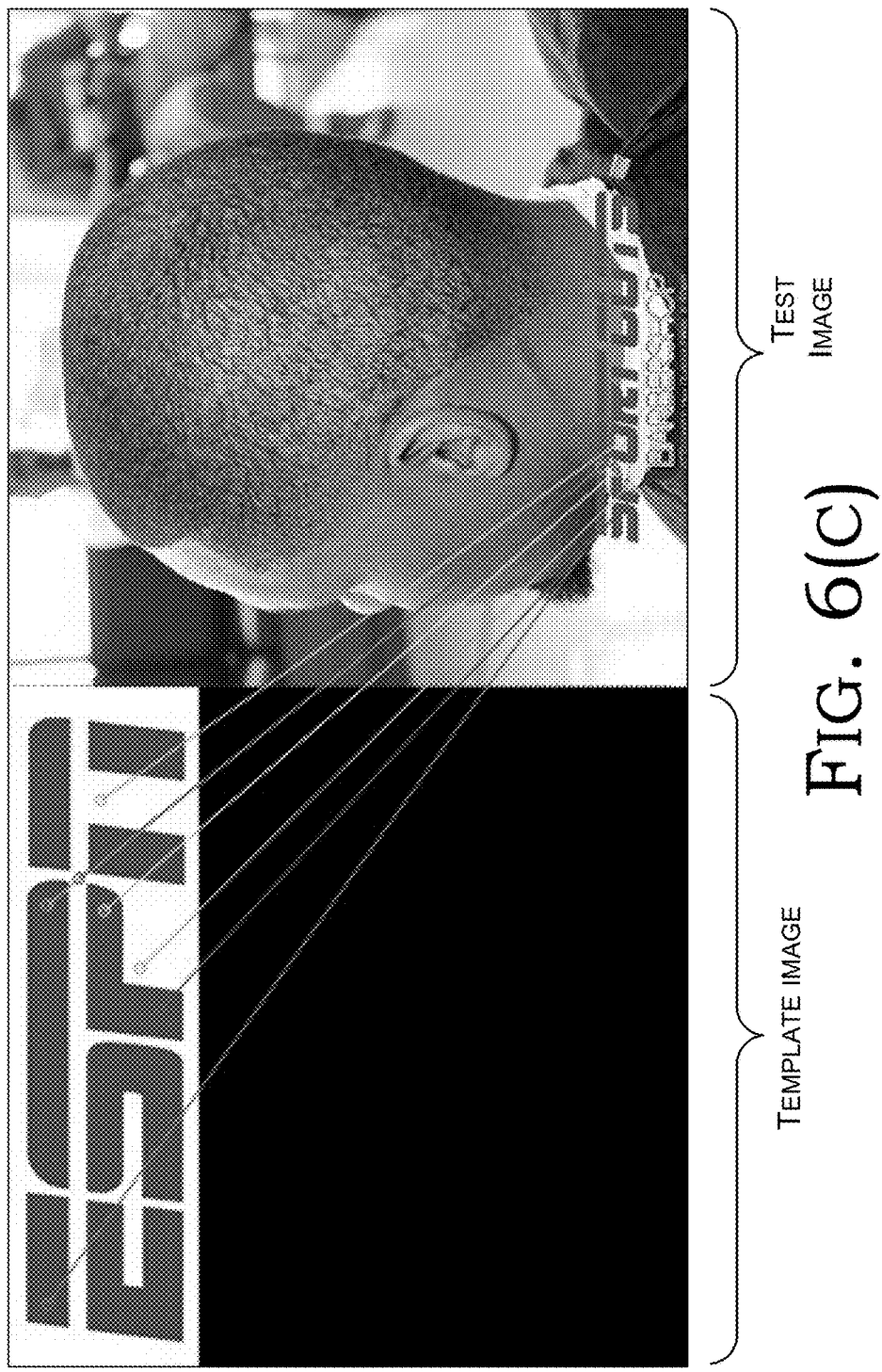

In an idealized version of matching the template appears in full in some of the test images, however real-world situations a test image may only contain a partial occurrence of the template. For example, as shown in FIGS. 6(a) and 6(b), the template image (on the left) is only partially contained in the test image (on the right). In addition, some test images contain small sections that resemble the template but nonetheless are not actual matches. For example, as shown in FIG. 6(c), aspects of the test image on the right contain some sections that match the template image on the left, although a person viewing the images can tell that the template image does not actually match the test image.

Applications of the (template to test) image matching rely on accuracy of the resulting match, and when the candidate matching images contains a high proportion of false matches; it may not be satisfactory to rely on all of the candidate matching images. For example, some applications may display matching results, and it is undesirable to display false matches. It is desirable to find ways to filter and classify the candidate matches so that only or mostly true positive matches are displayed.

Ideally, a filtering process would only remove candidate matches that are not true positive matches. Ideally, the classifying processes would classify a candidate match with complete accuracy and would never decide that a true positive match was a false positive or vice versa. Actual classifiers may make errors and wrongly assign matches. The errors can be of either type. Incorrect class assignment by the classifier would reduce the precision and/or recall of the overall matching process. Ideally error rates would be as low possible. In many cases, precision and recall can be traded off to meet the needs of consumers of the data.

Description

Figure 1:
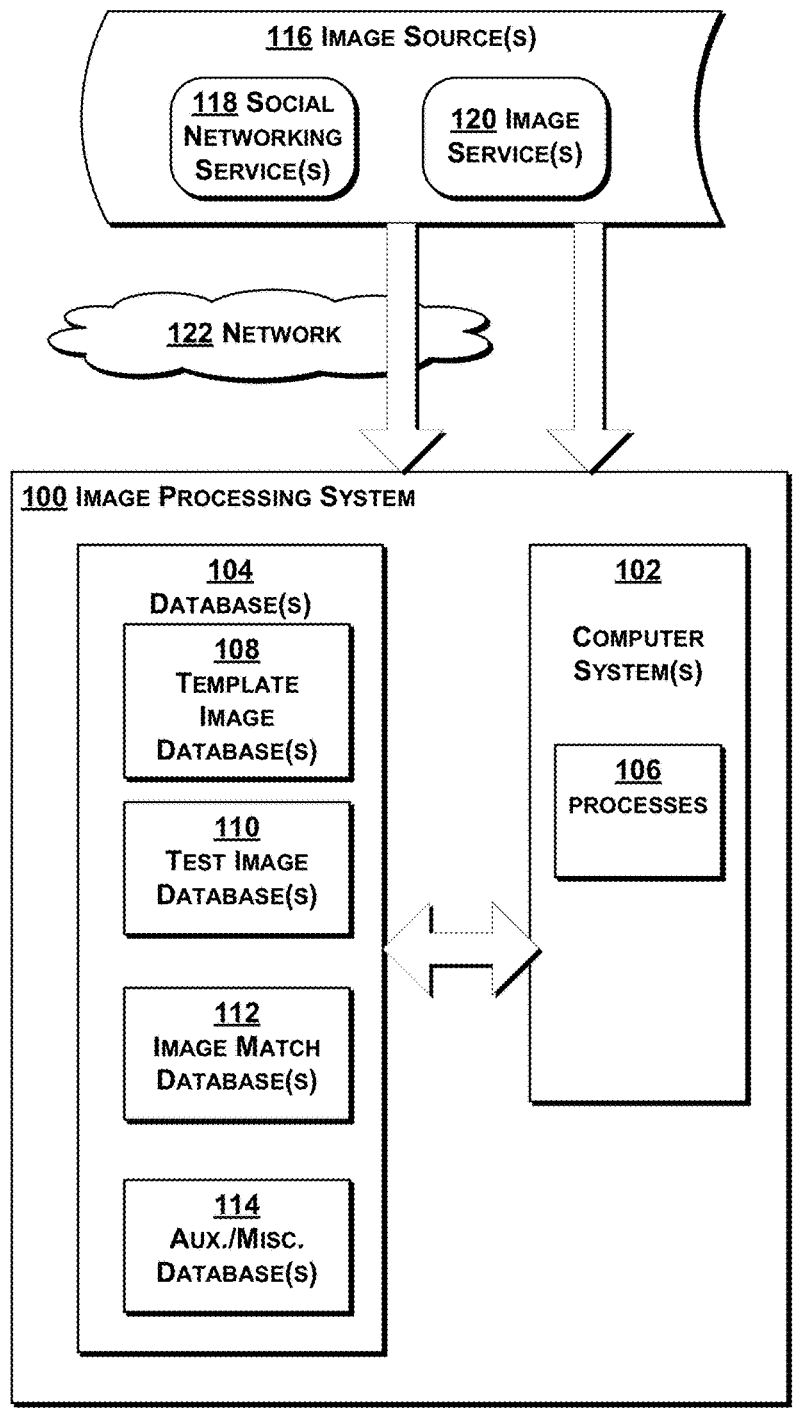
FIG. 1 depicts an overview of a system according to exemplary embodiments hereof.

As shown in FIG. 1, an image processing system 100 according to exemplary embodiments hereof includes one or more computer systems 102 operatively connected to one or more databases 104. Processes 106 running on the computer system(s) 102 interact with the databases 104 as described herein.

The database(s) 104 preferably include one or more template image databases 108, one or more test image databases 110, one or more image match databases 112, and one or more auxiliary/miscellaneous databases 114, each described in greater detail below. The one or more template image databases 108 may also be referred to herein as template image database(s) 108. Similarly, the one or more text image databases 110 may also be referred to herein as text image database(s) 110; and the one or more image match databases 112 may also be referred to herein as image match database(s) 112. The various databases may be implemented in any known manner, including as a file system in an operating system, and the system is not limited by the manner in which any particular database is implemented or maintained or accessed. There is no requirement for the databases to be implemented in the same manner. The database(s) 104 may be co-located with each other and/or with the computer system(s) 102, or they may be remotely located. The database(s) may be distributed.

The image processing system 100 obtains images from one or more image sources 116 (also referred to as image source(s) 116), which may include one or more social networking services 118 (e.g., Facebook, Twitter, and the like) and other image generating or providing services 120. A presently preferred implementation obtains data about images primarily from data providers (or directly from the social media sites) such as GNIP and Datasift, both aggregators of social media data. These aggregators provide the ability to filter social media posts for only the ones mentioning photos and/or other filters for geography, language, inclusion of words, etc., thereby providing an initial pre-filtering step using information (or meta-data) already known about an image. In some cases the retrieval of images (photographs) may be a two-step process in which, first, the system retrieves social media posts, e.g., from the data aggregators, and then the system looks in the data for links to images. As a second step of this process the images (e.g., photos) are retrieved.

In some cases an image source 116 may provide a link (e.g., a URL or the like) to a web page or the like containing one or more images. The image source 116 may have pre-filtered the web pages to include links only those that it considers contain one or more images. The image source 116 may also provide meta-data about the link and/or the web-page. This meta-data may include location and or user information associated with the web pages and/or the images they contain.

The image processing system 100 may obtain the images via a network 122 (e.g., the Internet) and/or in some other manner. It should be appreciated that the image processing system 100 may obtain images from different image sources in different manners.

With reference now to FIG. 2(*a*), an exemplary template image database 108' may contain template image data 124 for multiple template images. As used herein, a template image refers to an image that is to be looked for, in whole or in part, in other images. A template image may be or comprise any image, including one or more of: a logo, a face, textual information, etc. A template image may be fully or partially machine generated. The system is not limited by the content of template images or the way in which they are generated, obtained, or stored.

The template image data 124 for a particular template image may be generated in an offline process, as shown, e.g., in FIG. 3(*a*), in which a template image 300 is processed by an initial setup mechanism 302 to produce template image data 124 corresponding to the template image 300. Preferably each template image is uniquely identifiable within the system, and, as shown in FIG. 2(*b*), exemplary template image data 124 may include a template image identifier 126 and template image feature points 128 (e.g., generated by the initial setup mechanism 302). A copy of each template image is preferably maintained in database(s) 104, preferably in template image database(s) 108, and each template image is preferably accessible in the database(s) 104 using its corresponding template image identifier 126.

Features are locations within an image that can be used by a matching algorithm to try to find instances of a template image in a test image. The features may also include a description of the image at or near that point. Feature points are preferably picked in such a way that the equivalent locations will also be picked if the image is transformed in various ways (e.g., lighting changed, rotated, scaled, tilted). The feature descriptors are preferably designed to be invariant across a various transformations to the image.

It should be appreciated, however, that the template image data 124 may be determined or derived from more than one template image or from more than one version of a template image (e.g., from scaled versions, etc.). Those of ordinary skill in the art will therefore realize and appreciate, upon reading this description, that a set of feature points that may be derived from other than one template image and from a process other than feature detection. Accordingly, it should be appreciated that template image data 124 in a template image database 108 may have been determined or derived from more than one template image (e.g., from variations of a template image), and furthermore, that there may not be any single template image that contains all of the feature points associated with a particular template image.

As shown in FIGS. 2(*c*)-2(*d*), an exemplary test image database 110' contains test image data 130 for multiple test images. As noted above, test images may be obtained, e.g., from image source(s) 116. Once obtained by the system 100 images are preferably assigned a unique test image identifier 132 and are stored in test image data 130 the test image database(s) 110 associated with the test image identifier 132. It should be appreciated that it is preferable to store a copy of the test image in the test image database(s) 110. Once a test image has been processed (as described in greater detail herein), the test image data 130 associated with the test image may include test image feature points 134.

The image feature points (template image feature points 128, FIG. 2(*b*) and test image feature points 134, FIG. 2(*d*)) may be stored in an image feature points structure, such as the exemplary logical structure shown in FIG. 2(*e*). Assuming there are k image feature points for a particular image, the logical structure includes an index (0 to k-1) for the feature point, a location in the image (e.g., a pixel) associated with the feature point, and a descriptor of the feature point. The form of the descriptor will depend on the feature extraction algorithm used, as described in greater detail below. In a present implementation the feature descriptors are SIFT descriptors. Those of ordinary skill in the art will realize and appreciate, upon reading this description, that different and/or other descriptors may be used. For example, the feature descriptors may be SURF or PCA-SIFT or GLOH descriptors. PCA-SIFT is described, e.g., in Yan Ke and Rahul Sukthankar. 2004. *PCA-SIFT: a more distinctive representation for local image descriptors*," in Proc. of the 2004 IEEE Computer Society Conference on Computer vision and pattern recognition (CVPR'04). IEEE Computer Society, Washington, D.C., USA, 506-513, the entire contents of which are hereby fully incorporated herein by reference for all purposes. GLOH descriptors are described, e.g., in Krystian Mikolajczyk and Cordelia Schmid "A performance evaluation of local descriptors", IEEE Transactions on Pattern Analysis and Machine Intelligence, 10, 27, pp. 1615-1630, 2005, the entire contents of which are hereby fully incorporated herein by reference for all purposes. SURF descriptors are described, e.g., in Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359, 2008, the entire contents of which are hereby fully incorporated herein by reference for all purposes. In addition, feature descriptors may be generated using deep learning convolutional neural networks. For example, Fischer, et al, "Descriptor Matching with Convolutional Neural Networks: a Comparison to SIFT," May, 2014, the entire contents of which are hereby fully incorporated herein by reference for all purpose, describe SIFT-like features that are generated by a neural network for the location identified by a SIFT detector as well as matching these descriptors.

In a presently preferred exemplary implementation the features are detected using a Lapacian across the whole image producing one set of features for the whole image. Those of ordinary skill in the art will realize and appreciate, upon reading this description, that different and/or other approaches to feature detection may be used. For example, in some alternate approaches features may detected using SIFT or MSER, or feature sets may be found for interesting regions of the test image and each region can be matched separately.

Feature detection may find hundreds of features for the template image and similarly, hundreds of features for the test image.

Those of ordinary skill in the art will realize and appreciate, upon reading this description, that any data structures shown herein are merely examples, and that different and/or other data structures and organizations may be used.

Figures 2F, 2G:
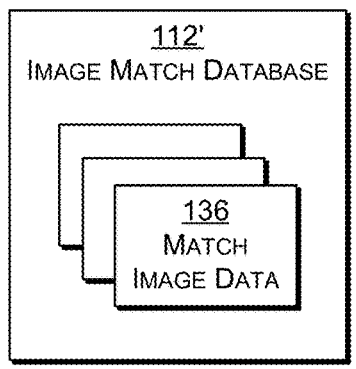

FIG. 2(f) shows an exemplary image match database 112' containing match image data 136 for one or more (preferably multiple) images.

Figure 3A:
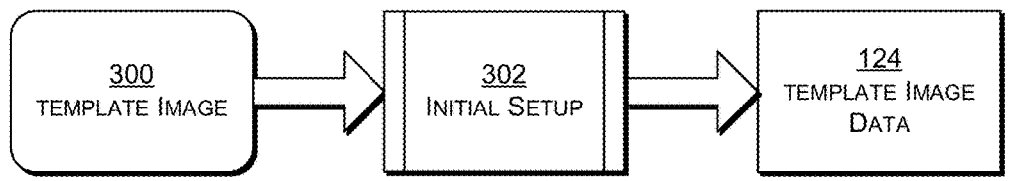
FIGS. 3(a)-3(e) show exemplary processing in the system of FIG. 1, according to exemplary embodiments hereof.
Figure 3B:
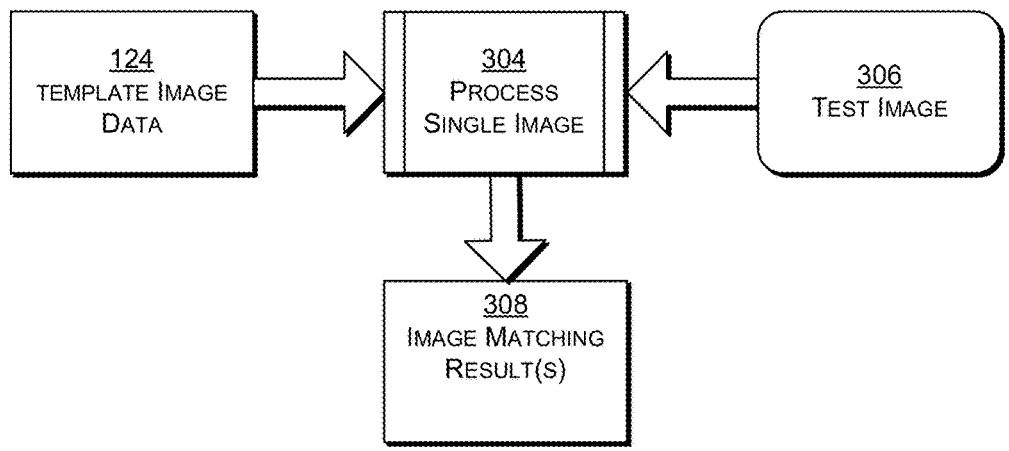

As shown in FIG. 3(b), in operation, the image processing system 100 may process a single test image 306 (at 304) with respect to particular template image data 124 to determine whether or not the template image corresponding to the template image data 124 is present in the single test image 306. If a match is found, i.e., if the process single image mechanism 304 determines with sufficient certainty that the template image corresponding to template image data 124 is present in the image 306, then the process produces image-matching results 308. The image matching results 308 may include an indication of where the template image is located in the single image 306 and may also include other information about the match. The image matching results 308 may be stored, e.g., in match image data records 136 in the image match database(s) 112.

Matching is done between features of the template images and the features of the test image, and the matching process finds feature points that correspond between the two images. Two feature points correspond/match if the descriptions of the two feature points are similar enough. A similarity measure (e.g., a distance) is used between the two points and if the distance is within some limit the two feature points are considered matches. The results of the matching process between a template image and a test image is a set of pairs of feature points called the match set. The first element of the pair is a feature of the template image and the second element of the pair is a feature of the test image. Associated with each pair of features is a measure of the similarity of the two features.

In presently preferred exemplary embodiments hereof, as shown e.g., in FIG. 2(g), in some modes (e.g., in a training mode), the match image data 136 may include: (i) a test image identifier 138 (corresponding to the unique identifier of the matched test image in the system); (ii) a template image identifier 140 (corresponding to the unique identifier of the matched template image in the system); (iii) an indication 142 (e.g., a Boolean value) of whether or not the match has been reviewed; (iv) an indication 144 (e.g., a Boolean value) of whether or not the match is considered a true positive match (e.g., based on a review); (v) the number of feature points in the template 146; and (vi) a match set 148. The number of feature points of the template is used to determine the size of the input vector to the classifier associated with the template. It should be appreciated that some of these fields may not be present or used in all embodiments hereof. For example, some embodiments may not have or use either/both of the indications 142 and 144.

Figures 2H, 2I:
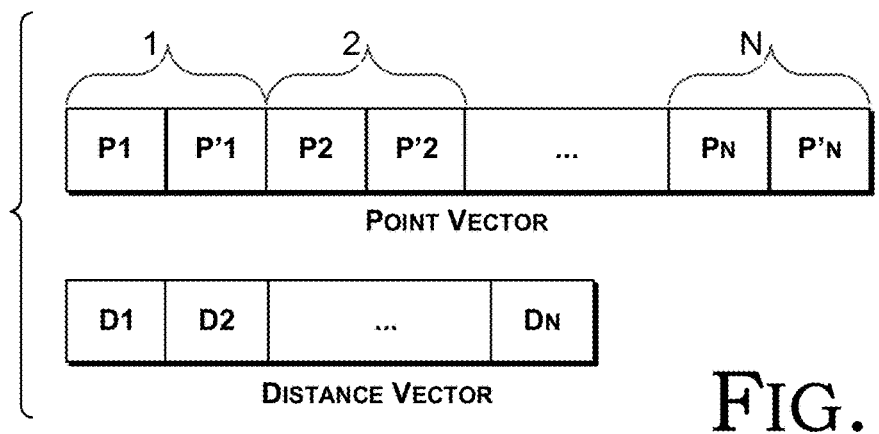

An exemplary match set (which may be part of the match image data 136) preferably includes a list of matched points from the template image and the test image, along with the distance between them. Thus, e.g., the exemplary match set 148' in FIG. 2(h) includes N matches $(P_1, P'_1)$, $(P_2, P'_2), \ldots (P_N, P'_N)$, with corresponding distances $D_1$, $D_2 \ldots D_N$. In this example, according to the matching algorithm, point $P_i$ in the template image matches or corresponds to point $P'_i$ in the test image, for i=1 to N, where $D_i$ is a distance for points $P_i$ (in the template image) and $P'_i$ (in the test image). In some implementations a match set 148 may be stored as a point vector comprising pairs of matched points along with a distance vector of the corresponding distances, e.g., as shown in FIG. 2(i).

As shown in FIG. 3(b), the mechanism 304 attempts to match a single template image with a single test image. However, in operation, a system 100 may attempt to match a particular test image with multiple template images, as shown, e.g., in FIG. 3(c). The mechanism 304 (to process a single test image with respect to a single template image) may thus be invoked repeatedly for multiple template images whose template image data 122 are stored in the template image database(s) 108. In some exemplary embodiments the routine 304 may terminate when a match is found for a template image. In other embodiments the mechanism 304 may continue to look for other matches (e.g., with other template images) even after a match is found.

As shown above with reference to FIG. 1, image-processing system 100 may obtain test images from image source(s) 114. These test images may be obtained in a batch and/or as one or more streams of images 310. For example, there may be a stream of images corresponding to each image source.

Figure 3C:
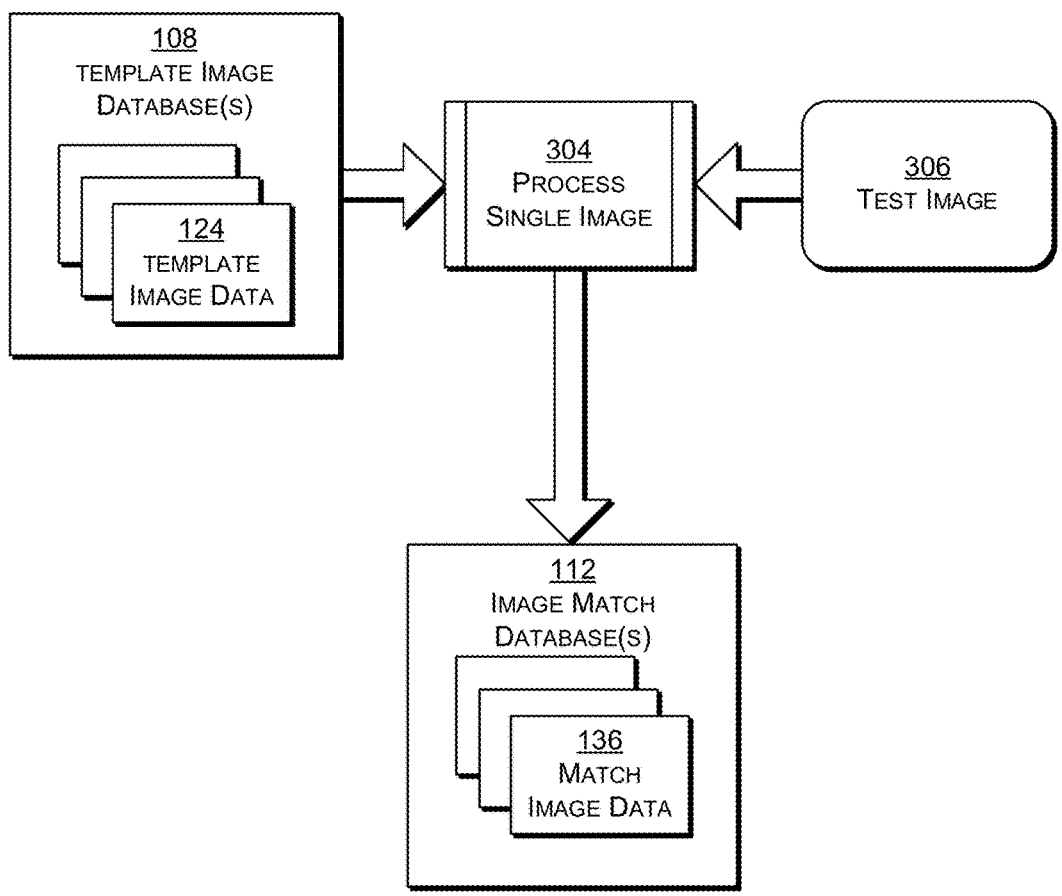
Figure 3D:
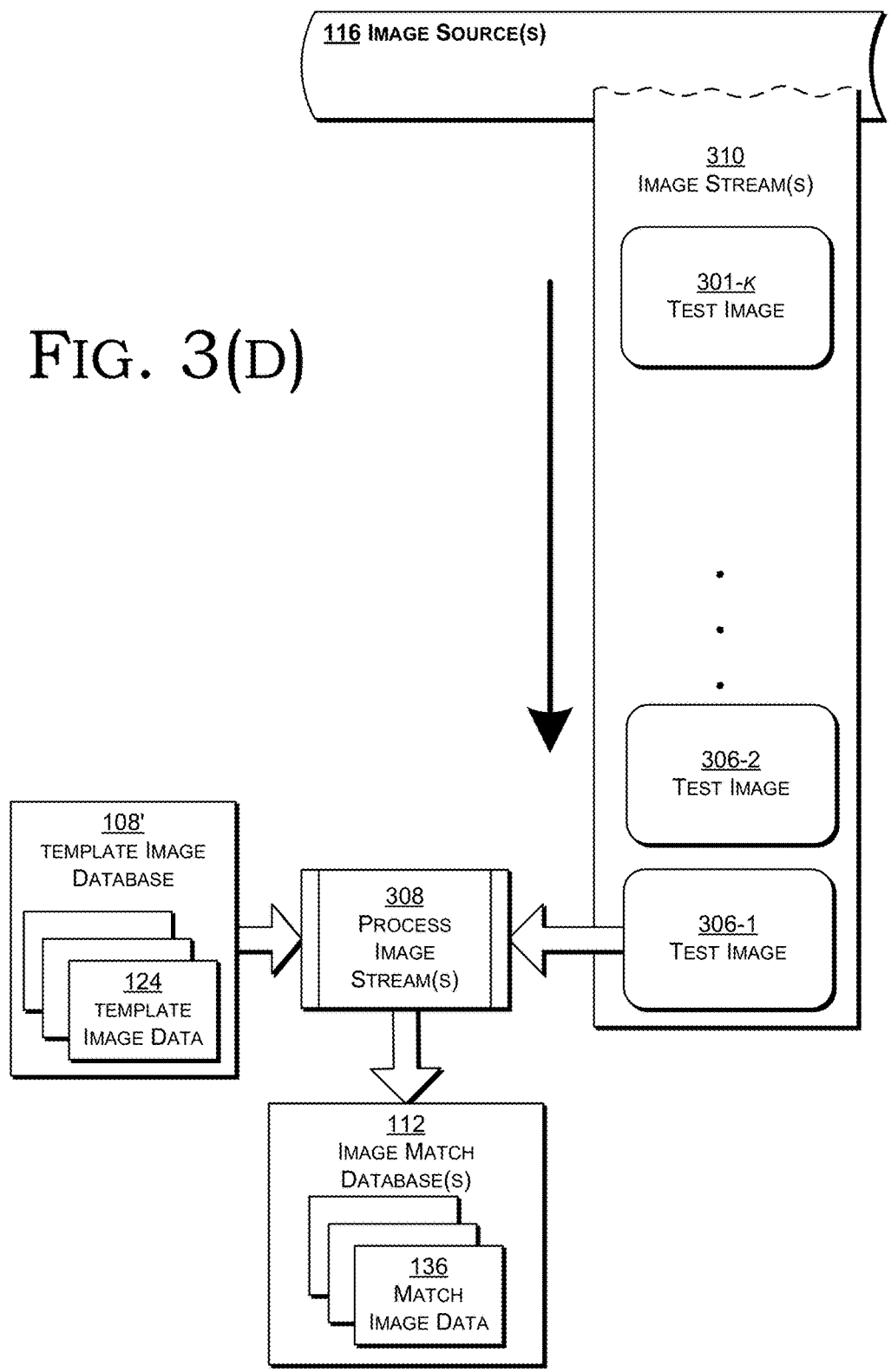
Figure 3E:
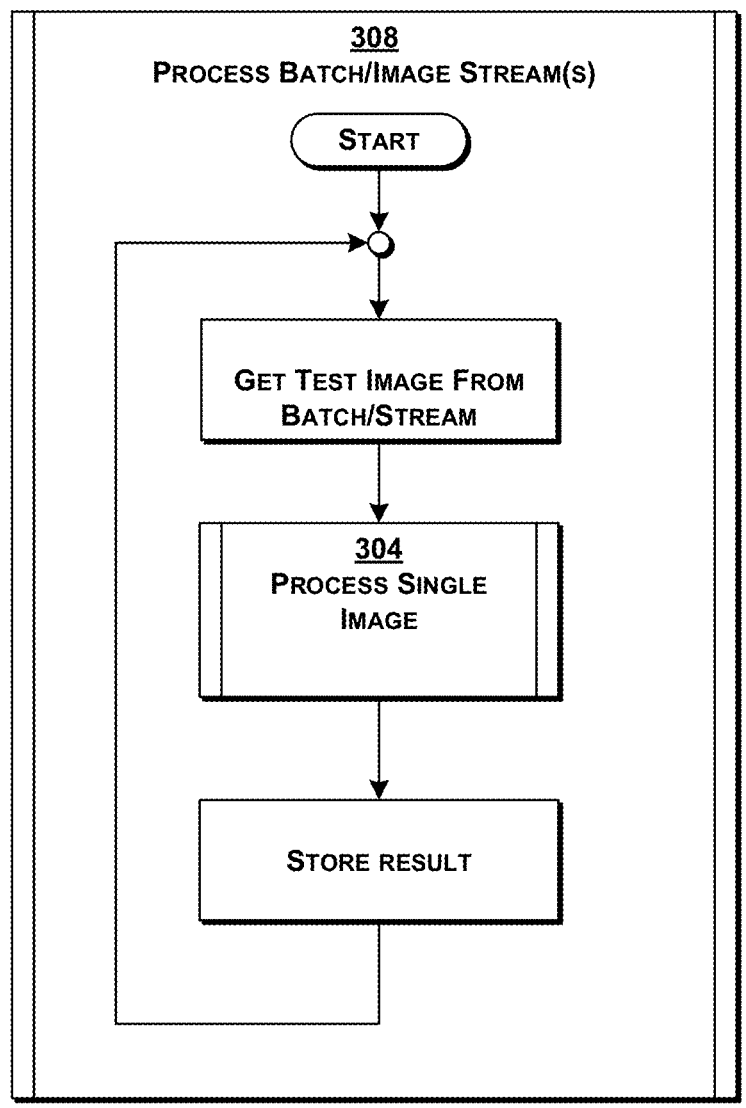

With reference to FIGS. 3(d)-3(e), the process image stream(s) mechanism 308 processes the images 306 in image stream(s) 310 (from the image source(s) 114) to determine whether one or more template images match images in the image batch/image stream(s) 310. In some embodiments this process may be implemented by repeatedly invoking the process single image mechanism 304 for images in the image stream(s) to determine whether any template images match the image stream images. Those of ordinary skill in the art will realize and appreciate, upon reading this description, that multiple test images may be processed in parallel on one or more processors and/or computer systems (e.g., in a distributed system). Additionally, the processing of a single image (304) may occur on multiple processors and/or computer systems. Although various processes are shown in series in some of the diagrams, it should be appreciated that some or all of the processes may be performed concurrently.

The mechanisms (process single image, process image stream(s), etc.) may correspond to processes 106 running on the computer system(s) 102.

In some real-world system, the image streams may contain millions of images, produced at a rate exceeding 2 million images per day (about 1,400 images per minute).

Processing a Single Image

An exemplary mechanism to process a single image (corresponding to 304 in FIGS. 3(b) and 3(c)) is described in David G. Lowe, Distinctive Image Features from Scale-Invariant Keypoints. Int. J. Comput. Vision 60, 2 (November 2004), 91-110, hereinafter "Lowe", and in U.S. Pat. No. 6,711,293, to Lowe, the entire contents of both of which are hereby fully incorporated herein by reference for all purposes. Lowe's technique is sometimes referred to as SIFT.

An image may be decomposed into a number of feature points to describe the visual content of the image. Feature points may be generated at predetermined locations (i.e., at a certain position, and radius) in an image, or computed from features found in an image. When feature points are chosen that are invariant to change (such as to translation or rotation), these feature points may be used to determine whether two images are related to each other.

For example, if two photographs are taken of the same scene from slightly different vantage points, each image will contain similar features in the overlap region between the images. When the feature points from each image are compared, it is possible to determine if the two images are related, and the coordinate transformation of how they are related.

Feature point matching may also be used to see if a template is found in an arbitrary image. A template may be a real or an artificial image that expresses a pattern to be found in the image. The template may be any image, including a computer generated brand logo. In this case, the matching operation can determine if the brand logo is present in a second image, and if so, where in the second image the brand logo is located.

Matching a template against an image generally includes a number of steps, namely:
1. Feature point extraction from the template image.
2. Feature point extraction from a test image.
3. Match feature points from template image with feature points in a test image.
4. Match feature points in a test image with the feature points from the template image.
5. Eliminate non-symmetrical matches.
6. Compute the best image transformation between the matching points.
7. Determine if the template image is present in the test image.

Feature Point Extraction

There are many feature detectors that may be used to implement the feature point extraction of the first two steps, including ones such as SIFT (Scale-Invariant Feature Transform), and SURF (Speeded Up Robust Features) that can detect features which are scale and rotationally invariant.

Feature point extraction from an image consists of two steps. The first step is to determine positions in the image that are stable (i.e., that do not move) over small and moderate amounts of image transformation such as scale and rotation. These locations define so-called keypoints in the image. A keypoint describes a two-dimensional (2D) location (e.g., (x, y) coordinates) and the angle (or orientation) of the feature (SIFT keypoints specify a 2D location, scale, and orientation).

The second step of feature point extraction is to extract a so-called descriptor (e.g., a numeric signature) from each feature point. For example, an implementation of the SIFT descriptor has 128 values that encapsulate the orientations in a region that surrounds the keypoint. Numeric descriptor values are often normalized such that the descriptor is of unit length. This normalization improves the descriptors invariance to illumination changes.

It should be appreciated that steps 1 and 2 generally differ as to when the feature point extraction is computed. Typically the template image is known in advance and the feature point information can be constructed beforehand. Feature point extraction of a test image may be computed when the image is analyzed, and compared with the previously computed information from the template image.

Matching Feature Points

The third and fourth steps match (or attempt to match) feature points from one image to feature points from another image. This matching may be accomplished, e.g., by computing the nearest neighbors of each descriptor from a first image to descriptors in a second image. Descriptors come in many varieties ranging from binary (one-bit of information) to numeric for each element in the descriptor. For numeric descriptors, the nearest neighbors may be determined by the descriptors with the shortest distance. Although many distance formulas can be used, the L2 (Euclidean) distance is preferred. For each descriptor in one image, the closest matches (usually two) from the second image are computed.

Lowe describes a ratio test that computes the ratio of the smallest distance from a keypoint in a first image to a keypoint in a second image, to the second smallest distance from the same keypoint in the first image to a second keypoint in the second image. A large ratio (Lowe used a threshold of 0.8) may be used to indicate that two keypoints in the second image are similar to the keypoint in the first image. When this condition arises, there is no matching keypoint in the second image to the keypoint in the first image. This process is carried out by comparing every keypoint in one image to the keypoints in the second image.

The third and fourth steps differ in the direction of matching In the third step the keypoints from the template image are compared with the keypoints in the test image. In the fourth step the keypoints in the test image are compared with the keypoints in the template image.

Eliminating Non-Symmetrical Matches

The fifth step enforces a constraint that the best matching points between a first image and a second image should be the best matching points between the second image and the first image. This symmetric matching step discards the matches found in the third and fourth step if the best matches do not refer to each other. It should be appreciated that this step may eliminate feature points that occur more than once in either the template or test images. Those of ordinary skill in the art will realize and appreciate, upon reading this description, that this step may be optional or performed in other ways.

Computing the Best Image Transformation Between the Matching Points

The sixth step takes as input the keypoints from the template image that match the keypoints in the test image, and computes a geometric relationship between the points in each image. Many different methods can be employed to determine these relationships, including using a Hough transform (see, e.g., Lowe), affine transformation, or homography. A homography computes the projective transform to describe the relationship between two coordinate systems. The points determined from the fifth step do not necessarily share the same geometric transformation. One reason is that the points come from different, non-related, portions of the image. Another reason is that points belong to related objects, but the objects are grossly distorted. The RANSAC (RANdom SAmple Consensus) algorithm may be employed to find the best subset of matching points to compute the best transformation between two images. The RANSAC algorithm is described in Fischler, M. A., et al (June 1981), "Random Sample Consensus: A Paradigm for Model Fitting with Applications to Image Analysis and Automated Cartography," Comm. of the ACM 24 (6): 381-395, the entire contents of which are hereby fully incorporated herein by reference for all purposes.

Determining if the Template Image is Present in the Test Image

The seventh step identifies whether the template image is present anywhere in the test image. The result of the sixth step is either: (i) no homography (insufficient matching points exist between the template image and test image), (ii) an incorrect homography, or (iii) a valid homography.

An invalid homography is one in which the matching points between the template image and test image returns a mathematically valid result, but one which is impossible in the natural world. Invalid homographies may be treated as though no homography was computed.

A valid homography is used to establish the coordinate system relationship between points in the template image with the points in the test image. However, the homography might be valid only over a small region of the image, rather than over the entire area of the template image. In some cases this is acceptable if the template in the test image is obscured or distorted. In other cases, the matching region may be small because the template image is not found in the test image. For example, a portion of a letter in the template image may match the corresponding letter in the test image. This does not mean that the template image is present in the test image, only that they share a small common region. One common method to determine if the template image is present in the test image is to define a minimum overlap size between the template image and test image. A match between the template image and test image is returned only if the overlap area exceeds this threshold.

Matches May Be True or False

As noted above (with reference to FIG. 6(c)), features in the template can match features in a test image without the test image actually containing the template image. Features encode information about a small region of an image, and, for a small region in the template, there may be a very similar region in a test image whether or not the test image truly includes the template. A feature point describing such a region in the test image may match the feature point describing the equivalent region in the test image resulting in a matching feature points. This can happen more than once for a given template and test image, where several feature points from the template may have matches in the test image. In some cases this is due to a false match.

Validation of Match

Many test images will have a few feature points that match at least some features a template image. A number of methods may be used, alone or in combination, to validate a set of matching feature points. For example, geometric constraints that consider the pixel location of the feature points within the template and test image can be applied to the matching feature points to check their validity. Other validation techniques may consider the number of matching feature points and the coverage of the template image (e.g., logo) in the test image.

Geometric constraints check the internal consistency of pixel locations of a set of matching feature points. If a set of matching feature points implies that the template appears in the test image with a specific geometric transformation that can be computed, all of the other matching feature points should also obey the same or a very similar geometric transformation. For example, it would not be reasonable for some of the points to imply a scaling of the template in the image by a factor of 3 and the other points to imply a scaling by 10. The geometric constraints may be used to filter feature points in the match set resulting in a smaller match set.

In some cases the validation process may eliminate candidate matches via checks of coverage, homography, reprojection, number of match points, determinant, SVD ratio.

Figure 6D:
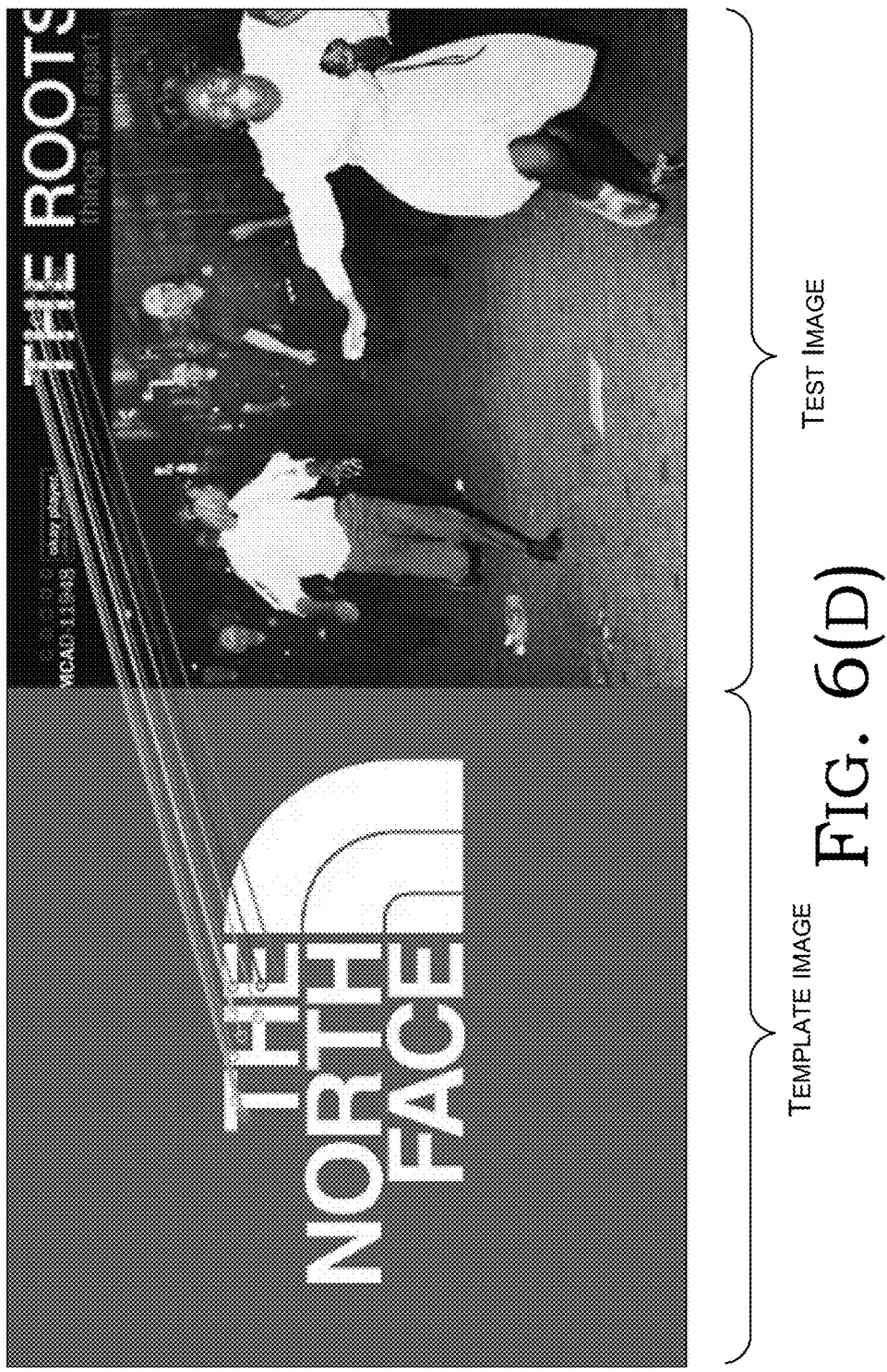

Some templates contain less distinct regions e.g. text in common typefaces especially common letters. For example, FIG. 6(d) shows a template with text (the word "THE") in a common typeface, causing a false match with test image.

One approach to filtering candidate matches is to eliminate matches that involve too few feature points. A candidate match is scored by how many feature points are part of the match set and a threshold is used for match points. If there are more points than the threshold, then the candidate match is considered a positive match otherwise it is considered a false match. However, some feature points may occur by happenstance more often in a random population of images not containing the template, and this simple scoring scheme may fail when not all feature points are equally likely to match. For example, six very unusual feature points may indicate a true positive match, while a false positive match may have nine very common feature points. This means that a high threshold for the number of match points may eliminate some true positive matches, whereas a threshold that is too low may include too many false positive matches.

Algorithms that select feature points are generally designed to select points that are stable under a set of geometric and lighting transformations, so that many of the same feature points or very similar feature points will be selected if the image is transformed or contains a transformed version of the template image. Thus the feature points are repeatable and can be used to match a transformed version of an image to the original image. This quality of the feature points is also referred to as the robustness. Robust feature points are selected to not involve any noise or clutter in the image. However, feature points and the regions of the image that correspond to the feature point descriptors are not necessarily unusual. How unusual they are may depend on the set of images under consideration. A feature point for a template may be very similar to feature points in many images that do not contain the template image or a transformed view of the template image. Another feature point may be very unusual and it will only be similar to feature points in images that contain the template image or a transformed view of the template image.

The ratio test suggested by Lowe tends to eliminate feature points where there is more than one similar feature point within the test image. This test eliminates some of the not-unusual feature points, but only if a similar feature point appears in the test image. The feature point may be common but not occur more than once in a test image.

The geometric constraints applied during match validation help eliminate matches based on common feature points. Geometric constraints are applied to validate match sets, so candidate matches based on several not-unusual feature points are often eliminated. Unless matching feature points in a test image are also in a spatial configuration that is equivalent to the configuration in the template image, these matching feature points are eliminated during validation. However, even with geometric constraints, false positive images will match a template image based on commonly occurring feature points. Examples of this occur with templates that contain text. Whole letters or parts of letters that occur in the template may also occur in candidate images and in equivalent relative locations so they obey the geometric constraints (see, e.g., FIG. 6(c)).

Figure 6E:
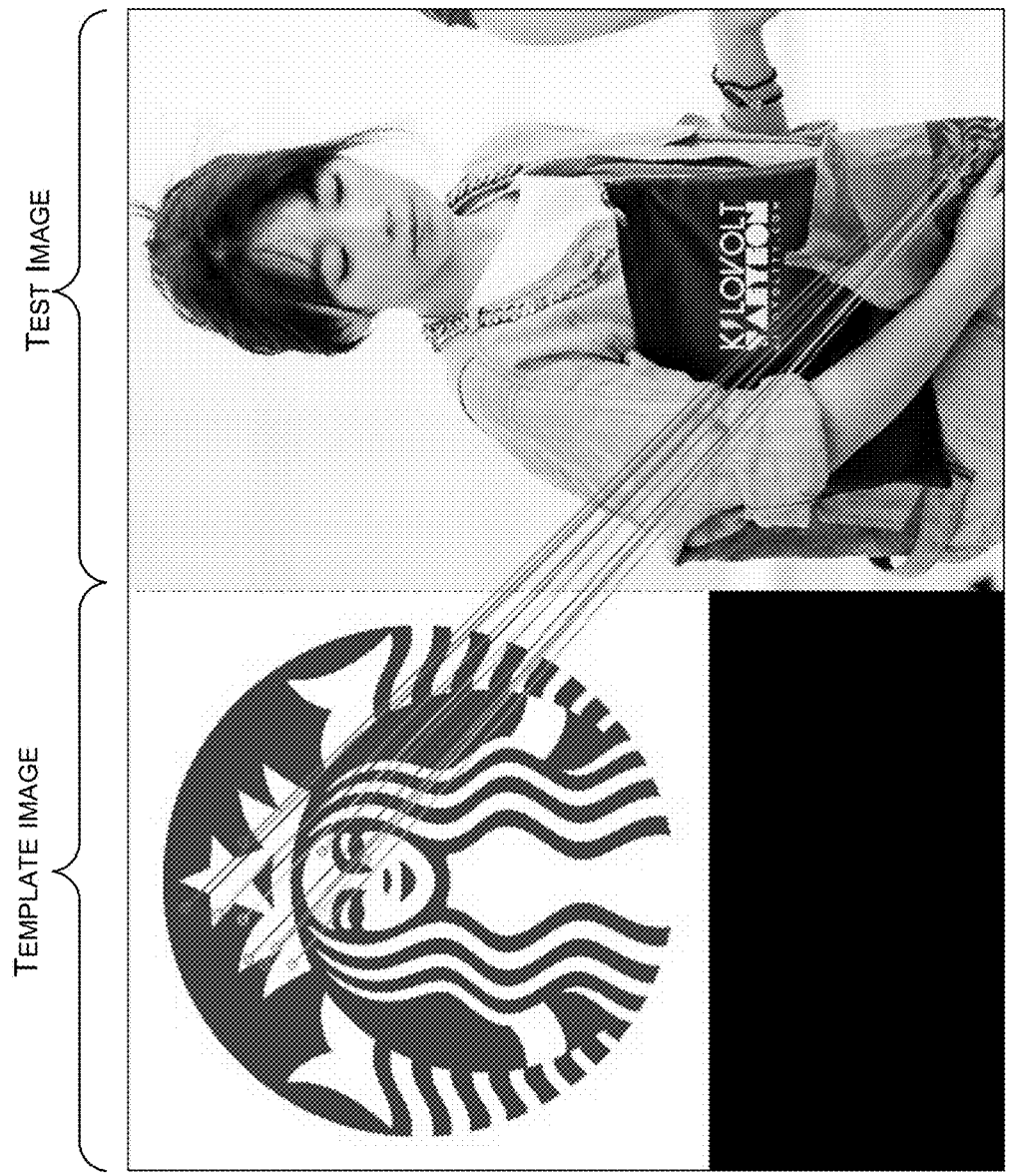

In some cases, matching feature points may be clustered in small region in template image and the candidate match could be classified as a false positive using a constraint on what percentage of the template must be covered. However, there are also true positive matches where only a small portion of the template is covered. A classifier based strictly on the percentage coverage would eliminate these good candidate matches. Matches that only cover a small portion of the template can occur if the template is in the test image but it is partially or mostly obstructed (see, e.g., FIG. 6(e)). In some of the test images that contain a small portion of the template and thus have low coverage percentage, one or more of the matching feature points are unusual. If the feature points were distinct enough this would indicate a true positive match.

To account for the fact that some feature points are common (more likely to match a point in a random test image) and some are unusual (less likely to match a point in a random test image), instead of using the count of the number of matching feature points, a validation approach may use a weighted sum of the feature points. This approach may compute a total score for each candidate match and use the score to classify the match. This approach would add more to the total when an unusual feature point was part of the match set and less when a common feature point was part of the match set.

Figure 6F:
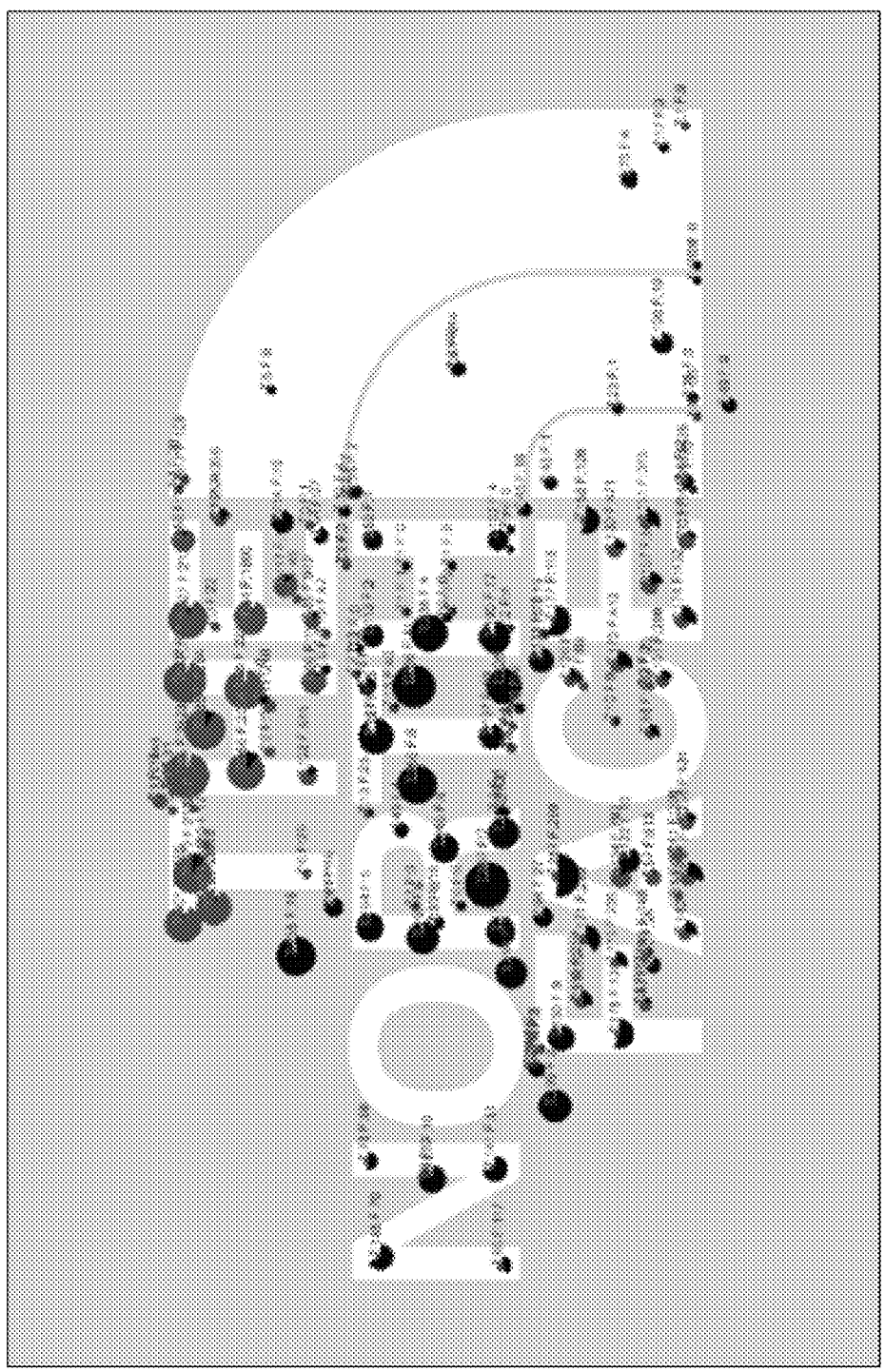
FIG. 6(f) shows a template image with charts showing the relative number of candidate matches for feature points.

FIG. 6(f) shows a template image for the stylized logo "THE NORTH FACE," with feature points displayed on the image. In the drawing each feature point is drawn as a pie chart where the total pie corresponds to all of the candidate matches that have matched this feature point. The slice of the pie in red corresponds the false positive matches and the slice of the pie in black corresponds to the true positive matches.

The angular size of a red slice represents what proportion of all candidate matches that include this feature point are false positive matches. A feature point that is substantially all red is always involved in false positives. A feature point that is substantially all black is always involved in true positive matches. The radius of each pie slice represents the proportion of the all candidate matches that include this feature point. Feature points with smaller radii are involved in very few of the candidate matches.

Figure 6G:
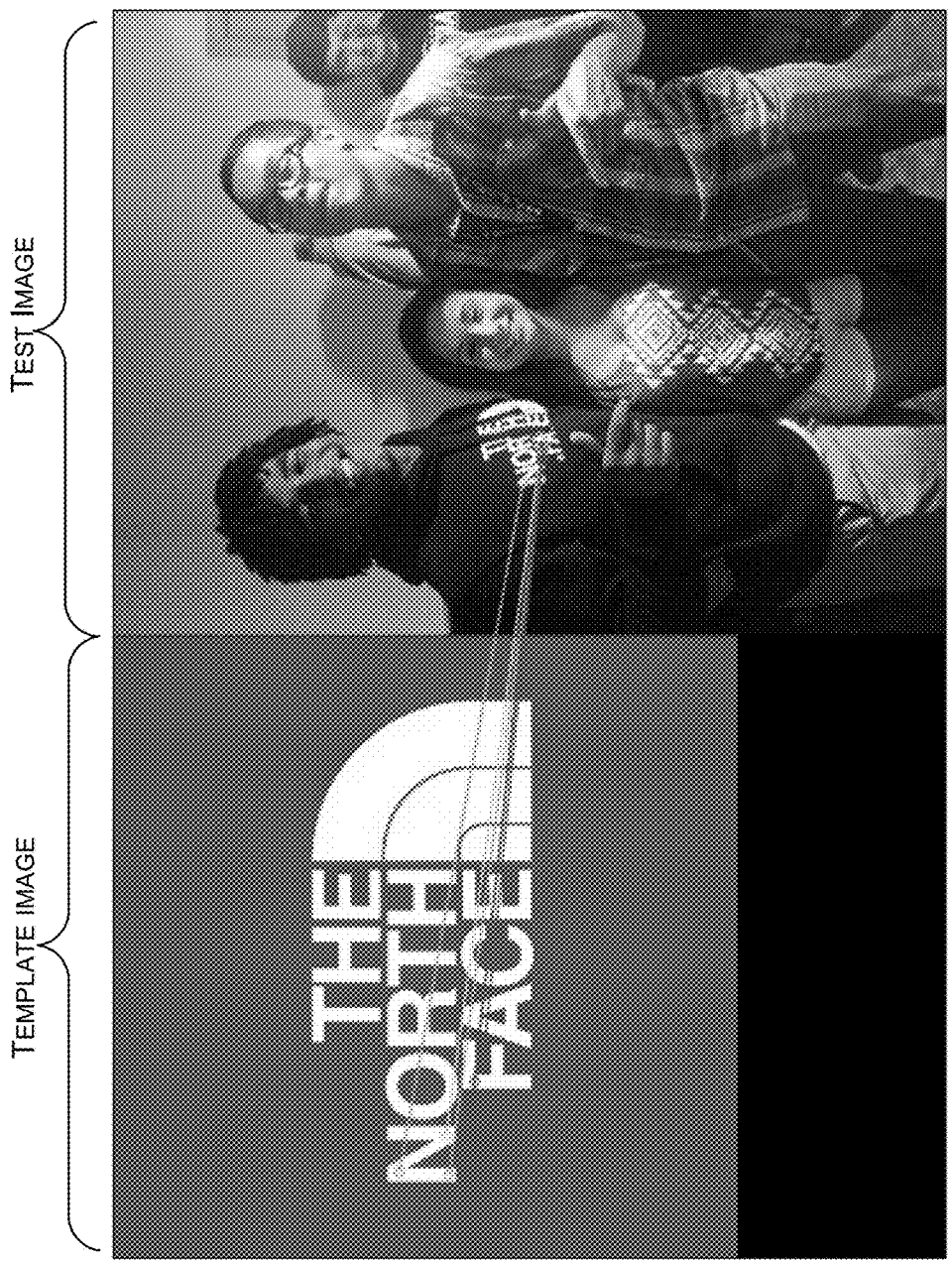

A weighted score provides a definite improvement on the simple system of classifying a candidate by counts of matching feature points, but it does not account for the configuration of the feature points. A candidate match could have six feature points in the match set and all of them could be common feature points, but if the points are in an unusual geometric configuration in the test image and in the template, then the set of feature points would be very unlikely to occur. This candidate match would then very likely be a true positive match, as, shown, for example in FIG. 6(g), when the template is the stylized logo for "THE NORTH FACE," the feature points on the "N" are common, as are the feature points on and around the "F", but that specific configuration of feature points is not common and when it occurs the candidate match is likely a true positive match. In contrast, in FIG. 6(d), the feature points on the "T", "H" and "E" are common, but so is the geometric configuration of those points.

Another method of evaluating a candidate match is to compute a correlation between regions of the template image and the test image. Since the template may appear in the test image scaled, rotated or otherwise transformed, the correlation is computed after the test image is aligned with the template image by transforming it using the homography computed from the matching feature points. A region used for the correlation can be either the full size of the template image, the region containing the matching points or a bloat of the region containing the matching feature points. While a correlation can detect when the test image does not truly contain the template image, but instead something that only resembles it at certain feature points, this technique is may not be very effective when the template appears in the test image, but occluded. It is difficult to find a threshold for the correlation that distinguishes between false positive matches and true positive matches with the template occluded or otherwise only partially visible.

Data Collection—Determining the Ground Truth

In order to build a classifier, it is necessary to determine a set of verified true positive data and false positive data. Data are collected from a set of candidate matches for a template image and these matches are used to determine the frequency of occurrence of the feature points of the template and the likelihood of a specific configuration of the feature points. Each candidate match is labeled (e.g., by a human reviewer) as to whether it is a true positive match or a false positive match. The feature point and label information associated with that template image are then used to train a model that may be used to classify candidate matches as a true positive or false positive match.

The process is described here for a particular template image. Those of ordinary skill in the art will realize and appreciate, upon reading this description, that this process may be repeated for multiple template images.

Figure 4A:
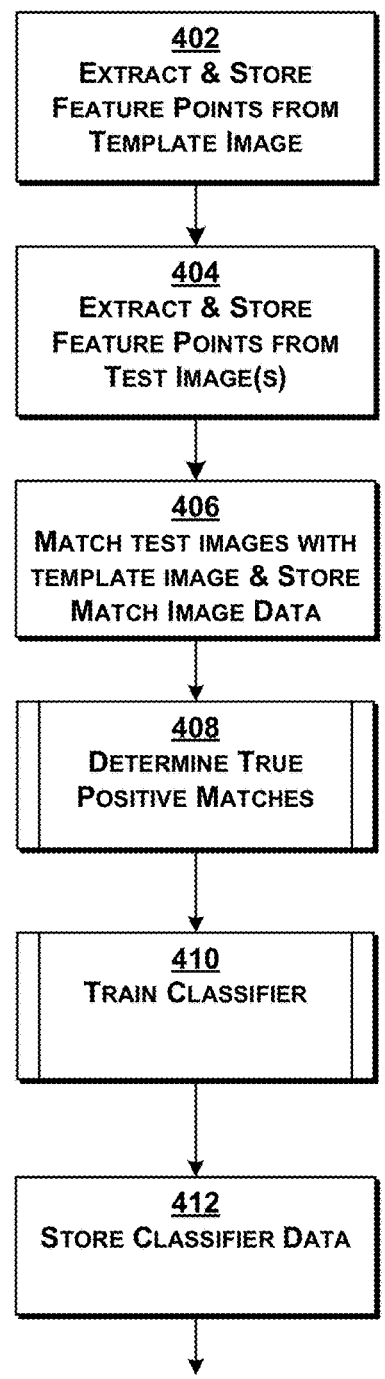
FIGS. 4(a)-4(b) are block diagrams showing exemplary processing according to exemplary embodiments hereof.

With reference to the flowchart in FIG. 4(a), feature points from a template image are extracted and stored (at 402). As noted above, information about the feature points of template image is stored (e.g., in template image data 124 in template image database(s) 108, FIGS. 1 and 2(a)-2(b)). Recall from above that a database may be or comprise a file system. Each feature point of a template is assigned an index (e.g., an integer index), as shown, e.g., in FIG. 2(e) and discussed above. The indices may be assigned successively starting with zero, and for each feature point the index, pixel location and a descriptor are stored (e.g., in template image data 130 in template image database(s) 108, FIGS. 1 and 2(*b*)-2(*c*) and 2(*e*)).

Figure 4B:
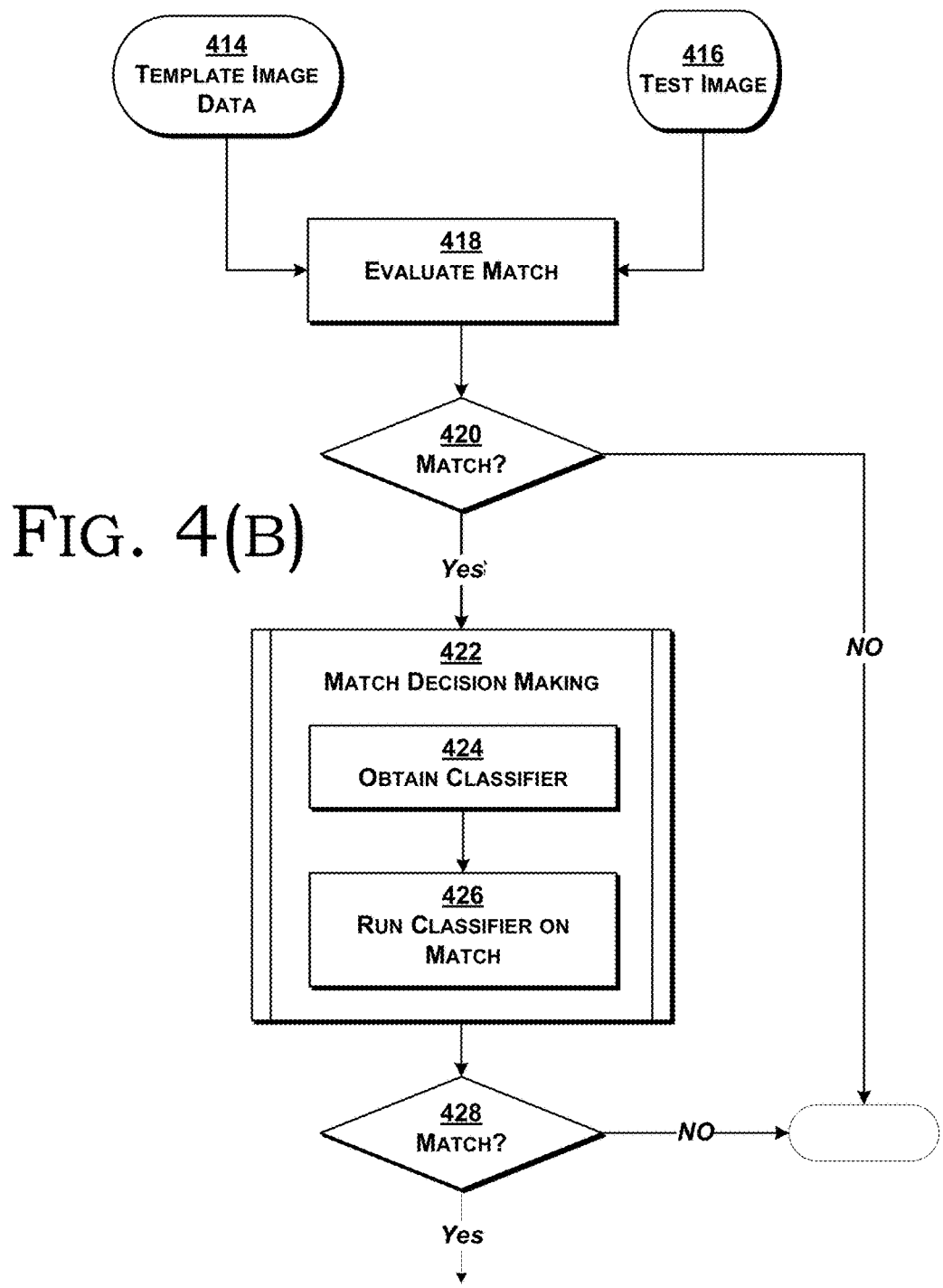

Similarly, feature point information for each test image is determined stored (e.g., in test image data 124 in test image database(s) 110) (at 404 in FIG. 4(*a*)). Preferably multiple test images are used. The feature points of the test image are similarly assigned an index (e.g. an integer index). For each test image, the indices are assigned successively starting, e.g., with zero, and for each feature point the index, pixel location and a descriptor are stored (e.g., in test image data 124 in test image database(s) 110, FIGS. 1 and 2(*c*)-(*e*)).

The test images may be stored in the test image database(s) 110 in database(s) 104, with each one having a unique file name.

The template image data is then matched with the test image data (at 406 in FIG. 4(*a*)) to produce a set of candidate matches.

Information about candidate matches is stored, e.g., as match records in image match database(s) 112, FIG. 1. For each candidate match the database(s) 112 contains a match record (match image data 136, FIG. 2(*f*)). The match record may contain an identifier for the image, the filename of the test image, the count of feature points in the template, and the match set for this candidate match and the distances for the feature points in the match set. A match record may also contain the template name. A match record may contain an indication (e.g., a Boolean value—referred to herein as tagged_p) of whether or not the match has been reviewed; and an indication (e.g., a Boolean value—referred to herein as true_positive_p) of whether or not the match is considered a true positive match (e.g., based on a review of whether the match is considered to be a true positive match or a false positive match).

A match set may stored as vector with each element containing a pair of indices defining the two matching feature points (e.g., as described above with reference to FIG. 2(*i*). The first index in the pair is the index of the template's feature point and the second index in the pair is the index of the test image's feature point.

The tagged_p field of the match record stores a value that indicates whether a reviewer has tagged this candidate match. For example, a value "1" indicates this match has been tagged and a value "0" indicates it has not been tagged. When the candidate match record is created, the tagged_p field is initialized with the default value of 0.

The true_positive_p field is a value which indicates whether this candidate match is a true positive or false positive, based, e.g., on the input of human reviewer. A value 1 is stored for a true positive match and the value 0 is stored for a false positive match.

The distances are computed during the matching process and are stored as a vector with each element containing the numeric distance between the two feature points stored in the corresponding position in the match set vector (see, e.g., FIGS. 2(*h*)-2(*i*)).

Once a set of candidate matches has been determined (at 406 in FIG. 4(*a*)); the set may be evaluated (at 408 in FIG. 4(*a*)) to determine true positive (and negative) matches.

One or more people review the template image and test images corresponding to the candidate matches and tag the set of candidate matches using a browser or application. Using the application, a reviewer views an image and decides whether the template matches the image or a portion of the image.

In some implementations the reviewer is shown images and boxes to indicate of the areas of the supposedly matching features. Alternatively, circles could be drawn at the location of each matching feature point in the image. Alternatively, the reviewer could be shown side by side the template image and the image from the candidate match with lines drawn connecting the feature point locations in the template and the candidate match image.

The reviewer indicates whether they believe that the candidate match is a true positive or false positive match, e.g., by selecting a button, tapping on the image, clicking on the image, tapping on the image or typing a key on the keyboard. When the reviewer indicates a selection, the true_positive_p value in the candidate match record is set to the correct state to indicate the reviewer's choice and the tagged_p field is set to 1. The system does not depend on the manner in which the user makes this selection.

While review by a single reviewer may be sufficient, in some cases two or more independent reviews are undertaken to ensure more reliable review results.

After a reviewer indicates whether the candidate match is a true positive match, the routine advances to the next candidate match for review. When the reviewer has tagged a sufficient quantity of images the reviewing task is done.

The results of the review process are tagged candidate matches that are stored in the candidate match records in the database(s) 112.

The tagged set of candidate images together is referred to herein as the ground truth.

Training a Classifier

The ground truth (e.g., as determined above) or a subset thereof for a particular template image may be used to train a classifier for that template image (e.g., at 410 in FIG. 4(*a*)). The classifier can then be used to predict which of the other candidate matches for this template are true positives are which are false positives.

Preferably one classifier is trained per template image. However, a particular template image may be treated as multiple templates, one for each (color) channel. In a present embodiment hereof, test images and template images are pre-processed to produce three separate images filtered to a specific color channel (preferably Y, U and V). The system then attempts to match on each of these separate channels for each template. It should be appreciated that not every logo or image will have information on each channel e.g. a black and white image will not have U or V. Although Y, U, and V channels are presently preferred, other channels may be used as well (or instead). At present the system will only generate a candidate match for a given template for one channel. The different channels for a particular template may be considered as different templates, e.g., for the purposes of training.

In some cases a separate classifier may be determined for each template-channel pair. The system may train one model for each template and have the channel as an input to the model, or separate visual channels can be used for matching. If separate channels are used, then each candidate match record would also store the channel used for this match. In addition, one classifier would be trained for each channel of each template based only on candidate matches for the associated template and channel.

An exemplary process of training a classifier for a template (410 in FIG. 4(*a*)) is as follows:

A set of reviewed match records for the template is retrieved from the database and the reviewed match records are divided into two sets, a training set and a testing set. The records may be divided using, e.g., a stratification algorithm as described below.

The training set is used to train a classifier. The testing set is then used to measure the classifier on an independent set of data. In a present implementation 70% of the ground truth is allocated to the training set and 30% is allocated to the testing set, although other proportions could be used.

Those of ordinary skill in the art will realize and appreciate, upon reading this description, that training takes computation resources and the amount of required resources grows rapidly with the size of the training set. In cases where there is too much ground truth data, a portion of the ground truth data would be sufficient for creating a classifier and the rest can be ignored.

When the ground truth is divided into the two sets, attention should be paid to the distribution of the two classes, the true positives and the false positives, between the two sets. This is especially important if the one of the two classes is much smaller than the other. For example, if there are only 10 false positives a random selection could end up with 9 false positives in the training set and only one in the test set. This would make it hard to get reliable numbers from the testing process. Stratification is a process of dividing members of a population into homogeneous subgroups before sampling and is used to ensure that each class is represented with approximately equal proportions in the training set and the testing set.

The stratification algorithm first divides the ground truth into two sets based on the class, so there is one set with all the false positives and one set with all the true positives. For each of the two classes the following steps are taken:
  (A) calculate the number of items in the training set. It is the total of the class size times the training percentage (70%)
  (B) initialize the number of items needed in the training set to number of items in the training set
  (C) iterate over all of the times in the class and assign the item from the class to the training set or the testing set:
    (C)(1) choose a random number from 0 to the unassigned number of items of this class;
    (C)(2) if the random number is less than the number of this class that are still needed in the training set, then the item is assigned to the training set and decrement the number of items needed in the training set. Otherwise, assign the item to the testing set.

A binary classifier is trained to predict which candidate matches are true positives and which are false positives for a given template. The classifier is preferably implemented as a support vector machine (SVM). A present implementation uses the LIBSVM implementation of a support vector machine (See, e.g., Chang, Chih-Chung; Lin, Chih-Jen (2011). "*LIBSVM: A library for support vector machines*". ACM Transactions on Intelligent Systems and Technology 2 (3), the entire contents of which are hereby fully incorporated herein by reference for all purposes).

A non-linear model is trained with a radial basis function (RBF) kernel. The parameters of the RBF kernel are selected using a grid search algorithm. The input to the classifier for a candidate match is a vector of values. The length of the input vector is one more than the total number of feature points found for the corresponding template. Each position in the vector, other than the last, corresponds to one feature point of the template. The correspondence is based on the feature point index for the template's feature points. If a given feature point is part of the match set of the candidate image, then the value of the corresponding element in the input vector is 1. If the feature point is not part of the match set, then the corresponding element in the input vector is set to 0. The final element in the input vector is the number of features in the match set. This count is normalized.

Input vectors are generated for each of the candidate matches in the training set and these are stored in a vector (called the training_examples in a current implementation). Another vector of the same size (called the training_labels in a current implementation) is used to store the class of each candidate match, i.e., true positive or false positive.

A grid search is done over the two parameters, c and g, of a radial basis function (RBF) kernel, to find the best parameter values. At each step of the search libsvm is used to train a model with these parameters and using as examples the information in the training_examples vector and as labels the training_labels. The libsvm training is done using cross validation. Cross-validation, sometimes called rotation estimation, is a model validation technique for assessing how the results of a statistical analysis will generalize to an independent data set. The grid search selects the model that best fits the training data by maximizing the percentage of the training examples that are correctly predicted from the cross validation. When grid search completes the scan over the ranges of the two parameters, the best parameters have been determined. Then a new model is trained without cross training and using the best parameters. This model is saved into the file system with a file name generated from the template name. The model is also tested on the full testing set and the results are reported. Those of ordinary skill in the art will realize and appreciate, upon reading this description, that a good set of parameters for the RBF kernel may be calculated by methods other than a grid search.

As described above, in a present implementation a support vector machine (SVM) is used as the classifier. SVM is a binary classifier that produces a result of a 1 or a 0 representing either true positive match (1) or false positive match (0). A non-linear model is used with an RBF kernel. With appropriate parameter selection, this achieved better results than a linear model—the training data was fit better and the predictions were more accurate. Those of ordinary skill in the art will realize and appreciate, upon reading this description, that different and/or other classifiers may be used. E.g., alternatively, a linear support vector machine may be used as the classifier. They are faster to train and run and in some cases may get better results. The current model produces a binary output; alternatively a model could be trained that produces a probability or a binary output and a probability. Other machine learning methods may also be used (e.g., Adaboost (short for "Adaptive Boosting," a machine learning meta-algorithm) with decision trees or Adaboost with linear SVMs). Additionally, neural nets models may be used for classification.

The feature detection process determines the feature points for the template image. Assume that n feature points have been detected for a template image. The input vector for the SVM classifier calculated for each test image is based on the output of the matching process. The input vector includes information about which of the n feature points found for the template image, matched feature points in the test image. The input vector is n+1 in length. A value is computed for each of the first n positions of the input vector as follows:

for i from 0 to n−1, where n is the number of feature points detected for the template image:
  if the index i is equal to the first part of any of the pairs in the match_set for this test image (or equivalently check if the i-th feature point of the template image matched a feature point of the test image)
    then set the value of the i-th position of the input vector to 1
    else set the value of the it position of the input vector to 0

In addition to the values corresponding to each feature point of the template image, the input vector includes at the end a value for the number of feature points in the match set. This number of feature points in the match set is normalized to a value between 0 and 1. The value 1 is used if the match set has more than a first threshold value ($T_1$, e.g., 24) or more feature points and 0 if there are fewer than a second threshold value ($T_2$, e.g., 6) feature points in the match set. If the number of feature points is in between $T_1$ and $T_2$, the value in the input vector is linearly scaled. Other normalization schemes may be used or the feature point count could be left un-normalized. Alternatively, the feature point would not be included in the input vector to the classifier.

Alternatively, instead of ones and zeros as the elements of the input vector corresponding to the feature points of the template image, the similarity measure for each feature point may be used. The similarity measure captures more information about the quality of the match for each specific feature point. The similarity measure is already scaled to between 0 and 1, but if a similarity measure is used that is not already scaled, it would be scaled when inserting into the input vector. This approach flips the sense of the input values since smaller values would mean the feature points were a stronger match and larger values would mean the match was weaker. For feature points that are not part of the match set, a value 1 would be used for the input vector value. Other normalization algorithms for the distance measure may be used.

The matching process results in a match between certain feature points in the template and feature points in the test image. A boosting process, e.g., as described in co-owned and co-pending U.S. patent application No. 62/022,592, titled "Image Matching And Object Recognition In Images With Match Boosting," and U.S. patent application Ser. No. 14/745,353, may find additional matches between these sets of feature points. The classifier input may be based on either the original match_set or the post-boosting match_set. The entire contents of U.S. patent applications No. 62/022,592 and Ser. No. 14/745,353 are hereby fully incorporated herein by reference for all purposes.

In a current implementation the libsvm model is trained using k-fold cross validation data set, with the value of k set to 5, however other values of k may be used. As is known, cross-validation, sometimes called rotation estimation, is a model validation technique for assessing how the results of a statistical analysis will generalize.

The parameters for the non-linear RBF kernel may be selected using a simple grid search algorithm. This approach steps the two parameters across a range of values and at each step trains a model using the pair of parameters and k-fold cross validation. The grid search linearly steps two variables linearly across the ranges. It computes each of the actual parameters for training as $2^x$, where x is the variable. The two variables are called the c_exponent and the g_exponent, and in a current implementation the c_exponent is stepped from −5 to 15 by steps of 2, and the g_exponent is stepped from 3 to −15 by steps of −2.

After the first round of grid search and the best c and g are selected from among the ones evaluated, a second grid search is done to further optimize the parameters. The second grid search is done for a smaller range that spans the best value from the first round of grid search. The step size used for the variables is half the prior step size.

Testing the Model with the Testing Set.

For some templates, for a given population of test images, the matching process produces many more false positives than true positives. This is called unbalanced data. For example, there may be 1,000 false positives and 100 true positives. To train a model for these templates it can be convenient to tag (review) fewer than the full number of false positives and instead stop at a few hundred. The ground truth for training would then not contain a representative ratio of false positives to true positive examples and the training may not pick the best model for the natural distribution of false positives and true positives. When training with libsvm we can include a weight for the false positive class to give more emphasis to this class and thus to offset the fact that we are using fewer examples than would naturally occur.

A current implementation only includes in the input vector for each candidate match information about the match between feature points. Alternatively (or additionally), in some exemplary embodiments hereof, additional information could be included in the input vector. For example the input vector may include, information from the test image that is not part of the features. Since SIFT descriptors mostly ignore color, a measure of the color for each matching points may be included in the input vector. Alternatively, a measure of the color match between the template image and the test image at each match point may be included. These schemes potentially add n elements to the input vector, where n is the number of feature points in the template.

Alternatively (or additionally), in some exemplary embodiments hereof, the input vector may include a measure of the overall correlation between the template image and the test image, where the correlation is computed after the homography computed for the match is used to transform the test image into the same coordinates system as the template image.

Alternatively (or additionally), in some exemplary embodiments hereof, the correlation at the image location of each feature point could be added to the input vector. The correlation would again be done after the test image was transformed. The correlation could be set to zero for non-matching feature points. This scheme would add n elements to the input vector, where n is the number of feature points in the template.

Alternatively (or additionally), in some exemplary embodiments hereof, the input vector could include a measure of the overall coverage.

It should be appreciated that some combination(s) of these alternate embodiments and values may be added.

Semi-Supervised Training with Labels

As described above, the process for training the classifier uses supervised learning and is trained from human generated training examples (the ground truth). Alternatively (or additionally) the classifier may be trained in a semi-supervised fashion from a set of images with weak labels.

As an example, brand logos are type of template image. For this type of template image there are sources of images in social that are labeled with a set of tags (e.g., so-called hashtags). The system may select a hashtag that corresponds to a brand and then extract a set of images labeled with that hashtag. While not every image labeled with the hashtag will contain the logo, since this population of images is biased towards one containing the logo, and if we assume that the false positive matches are not correlated with the hashtag, then the vast majority of the candidate matches for this population will be true positive matches and the matches in this set of images can be used as true positive matches in the ground truth. These matches may be used as a true positive ground truth. If, in addition there is a collection of images known to contain no logos of any kind, then any matches generated from this set of images using this logo as the template will be false positives and can be used as a false positive ground truth. A collection of images verified to contain no logos can be used for discovering false positives for all logo templates.

Once a classifier has been trained it may be stored (at 412 in FIG. 4(*a*)). The classifier for a particular template image may be stored, e.g., in the template image database(s) 108 in a record associated with the corresponding template image. For example, the classifier for a template image may be stored in the template image database(s) 108 keyed on the unique identifier for that template image.

Using the Classifier in Match Processing

A classifier may subsequently be loaded and applied to a new candidate match. Once a candidate match with a particular template image is determined, the system is able to access the corresponding classifier for that template image. An input vector is computed from the candidate match using the match set and distances to populate the input vector values. Then the libsvm model may loaded (e.g., from the database(s)) and be applied using the predict function of libvsm to compute the predicted class of the candidate match.

With reference to the flowchart in FIG. 4(*b*), in operation, a particular template image (with corresponding template image data 414) is being looked for in a test image 416. The match between the two images is evaluated (at 418) using, e.g., a technique that compares feature points from the two images. Any technique may be used for the match evaluation at 418, although in preferred implementations the technique described in co-pending and co-owned U.S. patent application No. 62/022,592, and Ser. No. 14/745,353, titled "Image Matching And Object Recognition In Images With Match Boosting," may be used. The result of match evaluation is either an indication of a match (i.e., at least some portion of the template image is present in the test image) or of no match (i.e., no portion of the template image is present in the test image). U.S. patent applications No. 62/022,592, and Ser. No. 14/745,353 have been fully incorporated herein by reference for all purposes.

Once match evaluation is complete (at 418), if no match was found then processing continues elsewhere (not shown, e.g., on a another template image or on a another test image). If a match is found (tested for at 420), then further decision making may occur (at 422) to further evaluate the match. This match decision making (at 422) may include obtaining (at 424) a classifier corresponding to the matched template image and then running the classifier (at 426) on the match data.

As noted above, an input vector may be computed from the candidate match using the match set and distances to populate the input vector values. Then the libsvm model may loaded (e.g., from the database(s)) and be applied using the predict function to compute the predicted class of the candidate match.

The template image associated with the match is known, and so the identifier of that template image may be used to access and obtain the corresponding classifier for that template image from the database(s) 104. In some implementation the classifier for a template image may be pre-fetched or cached in order to speed up the match decision making 422.

The outcome of the match decision making 422 may be evaluated (at 428) to determine if the match found at 418 is still considered a match.

Application of Techniques

The framework, system, techniques and mechanisms described herein have general applicability. However, in a presently preferred implementation the template images comprise logos and the like corresponding to products (e.g., goods and services) related to certain companies or other entities.

As used herein a logo refers to any symbol, image, text, or other design, or combination thereof, adopted or used by an entity to identify its products, goods, services, etc.

In some cases the system may use multiple versions of the same logo (e.g., at different sizes).

In operation multiple test images in one or more input streams are processed with respect to multiple logos from multiple entities.

Computing

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

Figure 5:
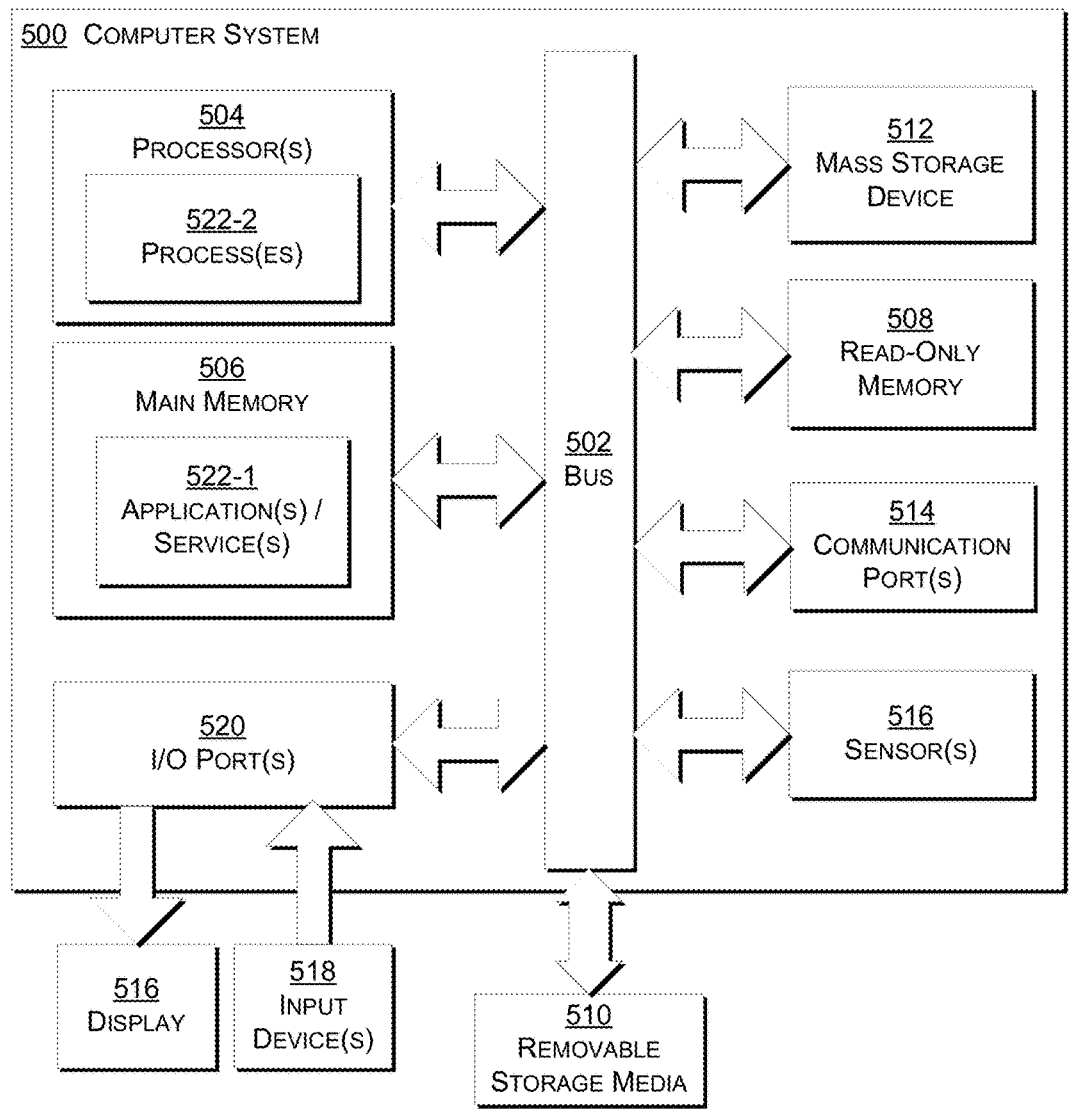
FIG. 5 is a schematic diagram of a computer system.

FIG. 5 is a schematic diagram of a computer system 500 upon which embodiments of the present disclosure may be implemented and carried out.

According to the present example, the computer system 500 includes a bus 502 (i.e., interconnect), one or more processors 504, one or more communications ports 514, a main memory 506, removable storage media 510, read-only memory 508, and a mass storage 512. Communication port(s) 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be (or include) any known processor, such as, but not limited to, an Intel® Itanium® or Itanium 2® processor(s), AMD® Opteron® or Athlon MP® processor(s), or Motorola® lines of processors, and the like. Processor(s) may include one or more graphical processing units (GPUs) which may be on graphic cards or stand-alone graphic processors.

Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520. Some or all of the peripheral devices may be integrated into the computer system 500, and the input device(s) 518 may be integrated into the display screen 516 (e.g., in the case of a touch screen).

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor(s) 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that support(s) the functionality as discussed herein (an application 522 may be an application that provides some or all of the functionality of one or more of the mechanisms described herein). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service(s) or mechanism(s) related to the application(s). In other words, the process(es) 524 represents one or more portions of the application(s) 522 performing within or upon the processor(s) 504 in the computer system 500.

It should be noted that, in addition to the process(es) 524 that carries (carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508, and/or mass storage device 512.

Those skilled in the art will understand that the computer system 500 can include other processes and/or software and hardware components, such as an operating system that controls allocation and use of hardware resources.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in network-based and computer communication (e.g., based on network traffic and distances), and these delays may cause delays in data reaching various components Inherent delays in the system do not change the real-time nature of the data. In some cases, the term "real-time data" may refer to data obtained in sufficient time to make the data useful for its intended purpose. Although the term "real time" may be used here, it should be appreciated that the system is not limited by this term or by how much time is actually taken to perform any particular process. In some cases, real time computation may refer to an online computation, i.e., a computation that produces its answer(s) as data arrive, and generally keeps up with continuously arriving data. The term "online" computation is compared to an "offline" or "batch" computation.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, "plurality" means two or more.

As used herein, whether in the written description or the claims, the terms "comprising", "including", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

As used herein, "and/or" means that the listed items are alternatives, but the alternatives also include any combination of the listed items.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the terms "first", "second", "third," and so on, if used in the claims, are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering. Specifically, use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The foregoing is merely illustrative and not limiting, having been presented by way of example only. Although examples have been shown and described, it will be apparent to those having ordinary skill in the art that changes, modifications, and/or alterations may be made.

Thus is provided a framework for finding template images in test or target images, in including boosting the number of matching points to improve match quality.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method, implemented by hardware in combination with software, the method comprising:
   for each particular template image of a plurality of template images:
   (A) determining a set of feature points associated with a template image;
   (B) for each particular test image of a plurality of test images:
      (B)(1) attempting to match a particular set of feature points associated said particular test image with the set of feature points associated with the template image, said attempting to match producing a match set comprising pairs of feature points, each pair containing a feature point from the template image and a corresponding matching feature point form the particular test image;
   (C) for at least some test images of said plurality of test images: evaluating said attempting to match in (B) to determine
      (i) a first set of true positive matches in said test images of said at least a portion of said template image in said particular test image, and
      (ii) a second set of false positive matches in said test images in which a portion of said template image is not considered to be in said particular test image;
   (D) training a match-verification classifier for said template, said training using (i) said first set of true positive matches, and (ii) said second set of false positive matches, wherein an input vector to the match-verification classifier includes at least one element of information for each of the feature points for the template, wherein at least one element of information for each point includes at least a presence of the feature point in the match set; and
   (E) associating said match-verification classifier with said template image.

2. The method of claim 1 wherein the set of feature points associated with the template image are based on multiple versions of the template image.

3. The method of claim 1 wherein said classifier trained in (D) is a binary classifier.

4. The method of claim 1 wherein said classifier trained in (D) comprises a support vector machine (SVM).

5. The method of claim 4 wherein the classifier trained in (D) comprises a linear support vector machine.

6. The method of claim 4 wherein the classifier trained in (D) comprises a non-linear support vector machine.

7. The method of claim 1 wherein act (B) further comprises:
   (B)(2) based on said attempting to match in (B)(1) determining whether at least a portion of said template image is present in said particular test image.

8. A computer-implemented method, implemented by hardware in combination with software, the method comprising:
   (A) determining a match set between a first set of feature points associated with a first image and a second set of feature points associated with a second image, said match set comprising pairs of feature points, each pair containing a feature point from the first image and a corresponding matching feature point form the second image;
   (B) when it is determined using at least said match set that at least a portion of a first image might be located within the second image:
      (B)(1) running a match-verification classifier associated with said first image on at least said match set;
      (B)(2) based on said running of said classifier in (B)(1) confirming a likelihood that said at least a portion of said first image might be located within the second image,
   wherein said match-verification classifier was trained on multiple feature points associated with (i) a known set of true-positive matches, and (ii) a second set of known false-positive matches, wherein an input vector to the match-verification classifier included at least one element of information for each of the feature points for the first image, wherein at least one element of information for each point includes at least a presence of the feature point in the match set.

9. The method of claim 8 wherein said classifier is a binary classifier.

10. The method of claim 8 wherein said classifier comprises a support vector machine (SVM).

11. The method of claim 10 wherein the classifier comprises a linear support vector machine.

12. The method of claim 10 wherein the classifier comprises a non-linear support vector machine.

13. A computer program product having computer readable instructions stored on non-transitory computer readable media, the computer readable instructions including instructions for implementing a computer-implemented method, said method operable on one or more devices comprising hardware including memory and at least one processor and running one or more services on said hardware, said method comprising:
   for each particular template image of a plurality of template images:
   (A) determining a set of feature points associated with a template image;
   (B) for each particular test image of a plurality of test images:
      (B)(1) attempting to match a particular set of feature points associated said particular test image with the set of feature points associated with the template image, said attempting to match producing a match set comprising pairs of feature points, each pair containing a feature point from the template image and a corresponding matching feature point form the particular test image;
(C) for at least some test images of said plurality of test images: evaluating said attempting to match in (B) to determine:
  (i) a first set of true positive matches in said test images of said at least a portion of said template image in said particular test image, and
  (ii) a second set of false positive matches in said test images in which a portion of said template image is not considered to be in said particular test image;
(D) training a match-verification classifier for said template, said training using (i) said first set of true positive matches, and (ii) said second set of false positive matches, wherein an input vector to the match-verification classifier includes at least one element of information for each of the feature points for the template, wherein at least one element of information for each point includes at least a presence of the feature point in the match set; and
(E) associating said match-verification classifier with said template image.

14. The computer program product of claim 13 wherein said match-verification classifier is a single SVM and wherein each feature point comprises (i) a spatial location of a corresponding point, (ii) a descriptor of a region; and (iii) an index of the point, and wherein the SVM classifier uses the index of the point and is not based descriptor of the region.

15. The method of claim 4 wherein said match-verification classifier is a single SVM and wherein each feature point comprises (i) a spatial location of a corresponding point, (ii) a descriptor of a region; and (iii) an index of the point, and wherein the SVM classifier uses the index of the point and is not based descriptor of the region.

16. The method of claim 8 wherein said match-verification classifier is a single SVM and wherein each feature point comprises (i) a spatial location of a corresponding point, (ii) a descriptor of a region; and (iii) an index of the point, and wherein the SVM classifier uses the index of the point and is not based descriptor of the region.

17. The method of claim 1 further comprising:
(F) using said match-verification classifier associated with said template image to verify a match produced by the attempting to match in (B).

18. The computer program of claim 13 wherein the method further comprises:
(F) using said match-verification classifier associated with said template image to verify a match produced by the attempting to match in (B).

19. The method of claim 15 wherein the length of the input vector is the number of feature points for the template and wherein the training uses, for each positive match and false positive match, an equal length input vector based on which features on the template match.

\* \* \* \* \*